US007848951B2

(12) United States Patent
Lidwell et al.

(10) Patent No.: US 7,848,951 B2
(45) Date of Patent: Dec. 7, 2010

(54) METHOD AND APPARATUS FOR PROVIDING SPECIFICALLY TARGETED ADVERTISING AND PREVENTING VARIOUS FORMS OF ADVERTISING FRAUD IN ELECTRONIC BOOKS

(75) Inventors: William Lidwell, Houston, TX (US); Edward L. Novak, Houston, TX (US)

(73) Assignee: Wowio, Inc., Los Angeles, CA (US)

( * ) Notice: Subject to any disclaimer, the term of this patent is extended or adjusted under 35 U.S.C. 154(b) by 524 days.

(21) Appl. No.: 11/464,154

(22) Filed: Aug. 11, 2006

(65) Prior Publication Data

US 2007/0233562 A1    Oct. 4, 2007

Related U.S. Application Data

(60) Provisional application No. 60/789,193, filed on Apr. 4, 2006.

(51) Int. Cl.
*G06Q 30/00* (2006.01)
(52) U.S. Cl. .................................... 705/14.67; 725/127
(58) Field of Classification Search .................. 705/14, 705/14.67; 725/127
See application file for complete search history.

(56) References Cited

U.S. PATENT DOCUMENTS

| 5,367,675 | A  | * | 11/1994 | Cheng et al. ................ 707/2 |
| 5,577,266 | A  |   | 11/1996 | Takahisa et al. |
| 5,931,901 | A  |   | 8/1999  | Wolfe et al. |
| 5,948,061 | A  |   | 9/1999  | Merriman et al. |
| 6,446,261 | B1 |   | 9/2002  | Rosser |
| 6,820,277 | B1 |   | 11/2004 | Eldering et al. |
| 6,842,604 | B1 |   | 1/2005  | Cook et al. |
| 6,898,601 | B2 | * | 5/2005  | Amado et al. ............... 707/10 |
| 7,124,090 | B1 | * | 10/2006 | Howard et al. .............. 705/14 |
| 2001/0016834 | A1 |   | 8/2001  | Yamanaka |
| 2001/0036182 | A1 |   | 11/2001 | Addante |
| 2002/0010757 | A1 |   | 1/2002  | Granik et al. |
| 2002/0078444 | A1 |   | 6/2002  | Krewin et al. |
| 2002/0082908 | A1 |   | 6/2002  | Yi et al. |

(Continued)

FOREIGN PATENT DOCUMENTS

WO    WO0058897    10/2000

(Continued)

*Primary Examiner*—John G Weiss
*Assistant Examiner*—M. Victoria Vanderhorst
(74) *Attorney, Agent, or Firm*—Steve Hassid; Silicon Edge Law Group LLP

(57) ABSTRACT

A method and apparatus for providing specifically targeted advertisements and preventing various forms of advertising fraud in electronic books. In one embodiment, the method includes; receiving or having access to the contents of books; receiving or having access to subscriber target criteria; receiving, creating, or having access to advertisements; receiving or having access to information from subscribers ;receiving or having access to requests for electronic books; determining or having access to whether subscriber target criteria for the advertisements is satisfied by the information from the subscriber requesting the electronic books; selecting a set of advertisements for electronic books by choosing advertisements having associated subscriber target criteria that are satisfied by the information from the subscriber requesting the electronic books; inserting the selected advertisements for electronic books into the electronic books; and providing access to the electronic books to the subscribers who requested electronic books.

32 Claims, 37 Drawing Sheets

U.S. PATENT DOCUMENTS

| | | |
|---|---|---|
| 2002/0087976 A1 | 7/2002 | Kaplan et al. |
| 2002/0123928 A1 | 9/2002 | Eldering et al. |
| 2002/0124249 A1 | 9/2002 | Shintani et al. |
| 2003/0004793 A1 | 1/2003 | Feuer et al. |
| 2003/0018968 A1 | 1/2003 | Avnet |
| 2003/0023489 A1 | 1/2003 | McGuire et al. |
| 2003/0028433 A1 | 2/2003 | Merriman et al. |
| 2003/0130887 A1 | 7/2003 | Nathaniel |
| 2003/0171990 A1 | 9/2003 | Rao et al. |
| 2003/0220833 A1 | 11/2003 | Benderev |
| 2004/0078809 A1 | 4/2004 | Drazin |
| 2004/0138952 A1 * | 7/2004 | Seet et al. ............... 705/14 |
| 2004/0148625 A1 | 7/2004 | Eldering et al. |
| 2004/0243470 A1 | 12/2004 | Ozer |
| 2005/0021398 A1 | 1/2005 | McCleskey |
| 2005/0021403 A1 | 1/2005 | Ozer |
| 2005/0076357 A1 | 4/2005 | Fenne |
| 2005/0119936 A1 | 6/2005 | Buchanan et al. |
| 2005/0125354 A1 | 6/2005 | Pisaris-Henderson |
| 2005/0166233 A1 | 7/2005 | Beyda et al. |
| 2006/0015406 A1 | 1/2006 | Beyda et al. |
| 2006/0020510 A1 | 1/2006 | Vest |
| 2006/0116924 A1 | 6/2006 | Angles et al. |
| 2006/0136294 A1 | 6/2006 | Linden et al. |
| 2006/0141923 A1 | 6/2006 | Goss |
| 2006/0200555 A1 | 9/2006 | Shannon et al. |
| 2006/0212348 A1 | 9/2006 | Lambert et al. |
| 2006/0212350 A1 * | 9/2006 | Ellis et al. ............... 705/14 |
| 2006/0212897 A1 | 9/2006 | Li et al. |

FOREIGN PATENT DOCUMENTS

| | | |
|---|---|---|
| WO | WO 0075845 A2 * | 12/2000 |
| WO | WO0109771 | 2/2001 |
| WO | WO0137189 | 5/2001 |
| WO | WO0193474 | 12/2001 |
| WO | WO0203227 | 1/2002 |
| WO | WO 2006016365 A2 * | 8/2004 |

* cited by examiner

2 ↘
          4
○ ○ ○          Create Your WOWIO Profile
◀ ▷ ⌂ ↻ + | https://www.wowio.com/users/useradd_auth.asp | ⊙ ° Q▾ Google
WOWIO  WOWIO: Publisher Logon  Old Dictionary  Make  Google  IDSA Buzz  Wired  Wikipedia  Amazon  AMSI  SC Gallery »
Create Your WOWIO Profile

Show Some I.D. ● ● ○ ○ ○          ◀ Back    Next ▶

────────── Name & Address ──────────

First Name   [Joe]
Last Name    [Ejemplo]
Address 1    [101 Rosemary Lane]
Address 2    [ ]
City         [Houston]
State        [Texas ▼]
Zip Code     [77098]

────────── Credit Card Info ──────────

Credit Card       [Visa ▼]
Number            [55555]           ⊕
CVV2              [555]             ⊕
Expiration Date   [1 - January ▼] [2006 ▼]
                  OR
Friends & Family Code [ ]           ⊕

────────── Referrals ──────────

Referral Code     [ ]               ⊕

○ ○ ○    Create Your WOWIO Profile

◀ ▷ ⌂ ⟲ + https://www.wowio.com/users/useradd_profile2.asp   ⊙ Q▼ Google

WOWIO   WOWIO: Publisher Logon   Old Dictionary   Make   Google   IDSA Buzz   Wired   Wikipedia   Amazon   AMSI   SC Gallery »

Create Your WOWIO Profile

Tell Us About You ● ● ● ● ○         [◀ Back]  [Next ▶]

──────── Education ────────

College Location [Texas] *required*
College [Amarillo College] *required*
Level of Education [College Sophomore] *required*
Major [Business] *required*

──────── Activities ────────

Viewing Preferences
- ☐ Arts and Theater
- ☐ Cartoons / Anime
- ☑ Documentaries
- ☐ Dramas
- ☐ Educational
- ☑ Game Shows
- ☐ Movies
- ☐ News
- ☐ Reality Shows
- ☐ Science Fiction
- ☐ Shopping / Infomercials
- ☐ Sitcoms
- ☐ Soaps
- ☑ Sports Listening Preferences
- ☐ Alternative
- ☐ Audiobook
- ☐ Blues
- ☐ Classical
- ☐ Country
- ☑ Dance
- ☐ Electronic
- ☐ Folk
- ☐ Hip-Hop / Rap
- ☑ Inspirational
- ☐ Jazz
- ☐ Latin
- ☑ New Age
- ☐ Pop
- ☐ R&B / Soul
- ☐ Rock
- ☐ Soundtracks
- ☐ Talk Radio
- ☐ World Reading Preferences
- ☑ Arts / Photography
- ☐ Biographies / Memoirs
- ☐ Business / Investing
- ☐ Comics / Graphic Novels
- ☐ Computers / Internet
- ☐ Cooking / Food / Wine
- ☐ Fiction
- ☐ Games / Puzzles
- ☐ Gay / Lesbian
- ☐ Health / Mind / Body
- ☐ History
- ☐ Home / Garden
- ☐ Horror
- ☐ Literature / Poetry
- ☐ Magazines / Journals
- ☐ Mystery / Thrillers
- ☑ Nonfiction
- ☐ Outdoors / Nature
- ☐ Parenting / Families
- ☐ Professional / Technical
- ☐ Reference
- ☐ Religion / Spirituality
- ☐ Romance
- ☐ Science
- ☐ Science Fiction / Fantasy
- ☐ Sports
- ☐ Travel

FIG. 7A

| | | |
|---|---|---|
| Hobbies | ☐ Arts / Crafts | ☐ Movies |
| | ☐ Board Games | ☐ Outdoor Activities |
| | ☐ Card Games | ☐ Photography |
| | ☐ Cars and Trucks | ☐ Playing Music |
| | ☐ Community Service | ☐ Playing Sports |
| | ☐ Cooking | ☐ Reading |
| | ☐ Computers / Internet | ☐ Religion / Spirituality |
| | ☐ Dancing | ☐ Role-Playing Games |
| | ☐ Dining | ☐ Television |
| | ☐ Gardening | ☐ Theater |
| | ☐ Health / Fitness | ☐ Travel |
| | ☐ Listening to Music | ☐ Video Games |
| | ☐ Motorcycles | ☐ Watching Sports |

Sustenance

| | | |
|---|---|---|
| Favorite Foods | ☐ Asian | ☐ French |
| | ☐ Bagels / Breads | ☐ Greek / Mediterranean |
| | ☐ Barbecue | ☐ Ham / Pork |
| | ☐ Beef / Steak | ☐ Health / Vegetarian |
| | ☐ Breakfast Food | ☐ Indian / Pakistani |
| | ☐ Brewpub / Pub Fare | ☐ Italian |
| | ☐ Burger / Hot Dogs | ☐ Mexican |
| | ☐ Cajun / Creole | ☐ Middle Eastern |
| | ☐ Chicken / Poultry | ☐ Pizza |
| | ☐ Coffeehouse / Café | ☐ Seafood |
| | ☐ Deli / Sandwiches | ☐ Snack Food |
| | ☐ Dessert | ☐ Soup / Salad |
| | ☐ Diner | ☐ Southern / Soul Food |
| | ☐ Donuts / Pastries | ☐ Sushi |
| | ☐ Fast Food | |
| Favorite Beverages | ☐ Bottled Water | |
| | ☐ Coffee / Tea | |
| | ☐ Gourmet Coffee | |
| | ☐ Juice / Fruit Drinks | |
| | ☐ Milk | |
| | ☐ Soft Drinks | |
| | ☐ Sports / Energy Drinks | |

Tell Us About You ● ● ● ● ○    ◀ Back   Next ▶

FIG. 7B

Edit WOWIO Ad Campaign http://www.wowio.com/advertisers/ad_target1.asp

Target ● ● ○ ○   [◀ Back] [Next ▶]

---------- Designated Market Areas (DMAs) ----------

Available DMAs
- 504 - Philadelphia
- 506 - Boston (Manchester, NH)
- 807 - San Francisco-Oakland-San Jose
- 623 - Dallas-Fort Worth
- 511 - Washington, DC (Hagerstown)
- 524 - Atlanta
- 505 - Detroit
- 618 - Houston
- 819 - Seattle-Tacoma
- 539 - Tampa-Saint Petersburg (Sarasota)

Selected DMAs
- 501 - New York
- 803 - Los Angeles
- 602 - Chicago

Sort by [Size]

---------- Age, Gender & Race ----------

Age Range [18] to [24]

Gender  ☑ Female
        ☑ Male

Race  ☐ American Indian or Alaska Native
      ☐ Asian
      ☑ Black or African American
      ☐ East Indian
      ☑ Hispanic / Latino
      ☐ Middle Eastern
      ☐ Multiracial
      ☐ Pacific Islander
      ☑ White ---------- Salary & Employment ----------

Salary Range [Select one] to [Select one]

Employment Status  ☐ Full-time
                   ☐ Part-time
                   ☐ Homemaker
                   ☐ Retired
                   ☐ Self-employed
                   ☐ Unemployed Education Status  ☐ None
                  ☐ Student
                  ☐ Professional Continuing Education Target ● ● ○ ○   [◀ Back] [Next ▶]

Contact Us | Terms of Use | Privacy Notice
© 2006 WOWIO LLC

FIG. 23

```
┌──────────────────────────────────────────────────────────────────┐
│ 🆔 Create WOWIO Promotion - Mozilla {Build ID: 2005012606}  ☐ ☐ ✕ │
│ ▲ File Edit View Go Bookmarks Tools Window Help Debug QA         │
│ ┌──┬──┬──┬──┬──────────────────────────────────────────┬──┬───┐  │
│ │← │→ │🔄│✕ │🔍 http://localhost/managers/promo_basic.asp│▼│🔍Search│ │
│ └──┴──┴──┴──┴──────────────────────────────────────────┴──┴───┘  │
│ 📎 🔖 Create WOWIO Promotion                                  ✕  │
│ Promotion ● ○ ○ ○                                    [ Next ▶ ]  │
│ ------------------------------- Name --------------------------- │
│           Promotion Name [                              ]        │
│                                                                  │
│ ----------------------------- Duration ------------------------- │
│               Start Date [              ]                        │
│                 End Date [              ]                        │
│                                                                  │
│ --------------------------- Distribution ----------------------- │
│                 Quantity [              ]                        │
│                                                                  │
│                 Interval ⦿ By download, award every [    ] downloads. │
│                          ○ By time period, award randomly, once every [    ] days. │
│                                                                  │
│ --------------------------- Description ------------------------ │
│              Description ┌──────────────────────────┐            │
│                          │                          │            │
│                          │                          │            │
│                          │                          │            │
│                          └──────────────────────────┘            │
│                                                                  │
│ --------------------------- Adult Content ---------------------- │
│ Does this promotion involve alcoholic beverage products or services?  ○ Yes ○ No │
│ Does this promotion involve gambling-related products or services?    ○ Yes ○ No │
│ Does this promotion involve tobacco-related products or services?     ○ Yes ○ No │
│ Does this promotion involve sexually-oriented products or services?   ○ Yes ○ No │
│                                                                  │
│ 📁 ✉ 🗂 📋 cZ | javascript:sort Column(1);                      │
└──────────────────────────────────────────────────────────────────┘
```

FIG. 25

Target ●●● ○  [◀ Back] [Next ▶]

---
Education
---

Education Range [Select one ▼] to [Select one ▼]

Major
- ☐ Architecture
- ☐ Business
- ☐ Communication
- ☐ Education
- ☐ Engineering
- ☐ Fine Arts
- ☐ Health & Medicine
- ☐ Humanities
- ☐ Interdisciplinary Studies
- ☐ Law
- ☐ Natural Sciences & Mathematics
- ☐ Social Sciences
- ☐ Undeclared ---
Activities
---

Viewing Preferences
- ☐ Arts and Theater
- ☐ Cartoons / Anime
- ☐ Documentaries
- ☐ Dramas
- ☐ Educational
- ☐ Game Shows
- ☐ Movies
- ☐ News
- ☐ Reality Shows
- ☐ Science Fiction
- ☐ Shopping / Infomercials
- ☐ Sitcoms
- ☐ Soaps
- ☐ Sports

Listening Preferences
- ☐ Alternative
- ☐ Audiobook
- ☐ Blues
- ☐ Classical
- ☐ Country
- ☐ Dance
- ☐ Electronic
- ☐ Folk
- ☐ Hip-Hop / Rap
- ☐ Inspirational
- ☐ Jazz
- ☐ Latin
- ☐ New Age
- ☐ Pop
- ☐ R&B / Soul
- ☐ Rock
- ☐ Soundtracks
- ☐ Talk Radio
- ☐ World

Reading Preferences
- ☐ Arts / Photography
- ☐ Biographies / Memoirs
- ☐ Business / Investing
- ☐ Comics / Graphic Novels
- ☐ Computers / Internet
- ☐ Cooking / Food / Wine
- ☐ Magazines / Journals
- ☐ Mystery / Thrillers
- ☐ Nonfiction
- ☐ Outdoors / Nature
- ☐ Parenting / Families
- ☐ Professional / Technical

FIG. 28A

| | | |
|---|---|---|
| | ☐ Fiction | ☐ Reference |
| | ☐ Games / Puzzles | ☐ Religion / Spirituality |
| | ☐ Gay / Lesbian | ☐ Romance |
| | ☐ Health / Mind / Body | ☐ Science |
| | ☐ History | ☐ Science Fiction / Fantasy |
| | ☐ Home / Garden | ☐ Sports |
| | ☐ Horror | ☐ Travel |
| | ☐ Literature / Poetry | |
| Hobbies | ☐ Arts / Crafts | ☐ Movies |
| | ☐ Board Games | ☐ Outdoor Activities |
| | ☐ Card Games | ☐ Photography |
| | ☐ Cars and Trucks | ☐ Playing Music |
| | ☐ Community Service | ☐ Playing Sports |
| | ☐ Cooking | ☐ Reading |
| | ☐ Computers / Internet | ☐ Religion / Spirituality |
| | ☐ Dancing | ☐ Role-Playing Games |
| | ☐ Dining | ☐ Television |
| | ☐ Gardening | ☐ Theater |
| | ☐ Health / Fitness | ☐ Travel |
| | ☐ Listening to Music | ☐ Video Games |
| | ☐ Motorcycles | ☐ Watching Sports |

Sustenance

| | | |
|---|---|---|
| Favorite Foods | ☐ Asian | ☐ French |
| | ☐ Bagels / Breads | ☐ Greek / Mediterranean |
| | ☐ Barbecue | ☐ Ham / Pork |
| | ☐ Beef / Steak | ☐ Health / Vegetarian |
| | ☐ Breakfast Food | ☐ Indian / Pakistani |
| | ☐ Brewpub / Pub Fare | ☐ Italian |
| | ☐ Burger / Hot Dogs | ☐ Mexican |
| | ☐ Cajun / Creole | ☐ Middle Eastern |
| | ☐ Chicken / Poultry | ☐ Pizza |
| | ☐ Coffeehouse / Café | ☐ Seafood |
| | ☐ Deli / Sandwiches | ☐ Snack Food |
| | ☐ Dessert | ☐ Soup / Salad |
| | ☐ Diner | ☐ Southern / Soul Food |
| | ☐ Donuts / Pastries | ☐ Sushi |
| | ☐ Fast Food | |
| Favorite Beverages | ☐ Alcoholic Beverages | |
| | ☐ Bottled Water | |
| | ☐ Coffee / Tea | |
| | ☐ Gourmet Coffee | |
| | ☐ Juice / Fruit Drinks | |
| | ☐ Milk | |
| | ☐ Soft Drinks | |
| | ☐ Sports / Energy Drinks | |

Target ●●●○   [◀ Back] [Next ▶]

METHOD AND APPARATUS FOR PROVIDING SPECIFICALLY TARGETED ADVERTISING AND PREVENTING VARIOUS FORMS OF ADVERTISING FRAUD IN ELECTRONIC BOOKS

RELATED APPLICATION

This application claims the benefit of and priority to U.S. Provisional Application Ser. No. 60/789,193, filed Apr. 4, 2006, the contents of which are incorporated by reference herein in its entirety.

BACKGROUND

1. Field of the Disclosure

The present disclosure relates generally to providing advertising in electronic books. More specifically, the present disclosure is related to a method and apparatus for providing targeted advertising in electronic documents and preventing advertising fraud and the unwanted or illegal dissemination of electronic books. In particular, the present disclosure provides a method and apparatus for providing specifically targeted advertising in electronic books and preventing or limiting advertising fraud and the unwanted or illegal dissemination of electronic books, which provides a variety of benefits and advantages. Those benefits and advantages include, but are not limited to, allowing advertisers to directly target specific individuals who match their highly specific selection criteria, providing advertising in electronic books that improves the content value of the electronic book, providing improved advertising methods that are not as susceptible to various forms of advertising fraud, including click and impression fraud, preventing or lessening the illegal or unwanted dissemination of electronic books, providing incentives, promotions and prizes associated with the advertising in the electronic books that lessen the possibility that readers will provide inaccurate information or ignore the electronic advertising and improve the value and effectiveness of the advertising, allowing content providers the ability to benefit from advertising that they cannot choose in their content and still retain their credibility as impartial and uninfluenced content providers and lessening or eliminating the reader's cost to obtain or have access to electronic books.

2. General Background

Providing basic advertising in electronic books is well known in the art. For example, U.S. Patent Application Publication 2002/0188532 A1 to Rothstein discloses providing basic advertising in electronic books. More specifically, U.S. Patent Application Publication 2002/0188532 discloses placing advertising in the electronic books. U.S. Patent Application Publication 2002/0188532 also discloses placing the advertising in the electronic book near key-words in the electronic book and near the front of the electronic book.

Unfortunately, this and other prior art methods do not allow advertisers to place their advertising in front of only those subscribers that specifically match their specific selection criteria. As a result, advertisers waste money, resources and good will advertising to individuals they do not want to target and individuals not interested in or persuaded by their advertising. By placing advertising in front of only those individuals that meet certain specific criteria (which is typically determined by the advertiser), the advertiser can specifically target only those individuals that it believes are most likely to be positively influenced or persuaded by their advertising. Additionally, prior art methods of providing electronic books do not add content value to the electronic book provided, provide incentives, promotions or prizes for readers of the electronic books, encouraging them to read and consider the advertising instead of skipping over it. Prior art methods also do not provide safeguards and protection against illegal or unwanted dissemination of the electronic book and various types of advertising fraud which can be detrimental to both advertisers and content providers. For example, advertisers and content providers are often plagued with problems associated with click and impression fraud that lessen the value of the electronic advertising and have significant costs associated with both of them. Prior art methods also do not allow content providers to benefit from advertising that they do not specifically select or have control over, which allows them to disassociate themselves from the advertisers and thereby remain credible and impartial in the eyes of their readers and the public at large. Accordingly, for these and other reasons, there exists a need for an improved advertising method and apparatus that allows electronic books and their advertisements to reach a specifically targeted audience and prevents or greatly reduces illegal or unwanted dissemination of electronic books and various forms of electronic advertising fraud. The present disclosure provides these and other related advantages.

SUMMARY

The present disclosure is directed to a method and apparatus for providing specifically targeted advertising and preventing or greatly reducing illegal or unwanted dissemination of electronic books and electronic advertising fraud, which provides numerous benefits and advantages to the advertiser, reader, publisher, author and provider of the electronic book and its contents.

In one exemplary embodiment of the present disclosure, a method for providing individuals with a plurality of electronic books containing targeted advertising is provided. The method includes 1) receiving or having access to at least the contents of two or more books, 2) receiving or having access to one or more subscriber target criteria for one or more advertisements, 3) receiving, creating, or having access to one or more advertisements that are associated with the one or more subscriber target criteria, 4) receiving or having access to information from a first subscriber interested in receiving one or more electronic books, 5) receiving or having access to a first request from the first subscriber for a first electronic book, 6) determining or having access to whether the one or more subscriber target criteria for the one or more advertisements is satisfied by the information from the first subscriber requesting the first electronic book, 7) selecting a first set of advertisements for the first electronic book by choosing at least one of the one or more advertisements having one or more associated subscriber target criteria that are satisfied by the information from the first subscriber requesting the first electronic book, 8) inserting the selected first set of advertisements for the first electronic book into the first electronic book and 9) providing or providing access to the first electronic book to the first subscriber making a first request for a first electronic book.

In another exemplary embodiment of the present disclosure, a method for providing individuals with a plurality of electronic books containing targeted advertising is provided. The method includes 1) receiving or having access to at least the contents of two or more books, 2) receiving or having access to one or more subscriber target criteria for one or more advertisements, 3) receiving, creating, or having access to one or more advertisements that are associated with the one or more subscriber target criteria, 4) receiving or having access to information from a first subscriber interested in receiving one or more electronic books, 5) receiving or having access to a first request from the first subscriber for a first electronic book, 6) determining or having access to whether the one or more subscriber target criteria for the one or more advertisements is satisfied by the information from the first subscriber requesting the first electronic book, 7) selecting a first set of advertisements for the first electronic book by choosing at least one of the one or more advertisements having one or more associated subscriber target criteria that are satisfied by the information from the first subscriber requesting the first electronic book, 8) inserting the selected first set of advertisements for the first electronic book into the first electronic book, 9) providing or providing access to the first electronic book to the first subscriber making a first request for a first electronic book, 10) receiving or having access to information from a second subscriber interested in receiving one or more electronic books, 11) receiving a first request from the second subscriber for a second electronic book, 12) determining or having access to whether the one or more subscriber target criteria for the one or more advertisements is satisfied by the information from the second subscriber requesting the second electronic book, 13) selecting a second set of advertisements for the second electronic book by choosing at least one of the one or more advertisements having one or more associated subscriber target criteria that are satisfied by the information from the second subscriber requesting the second electronic book, 14) inserting the selected second set of advertisements for the second electronic book into the second electronic book and 15) providing the second electronic book to the subscriber making a first request for a second electronic book.

In yet another exemplary embodiment of the present disclosure, an apparatus for providing one or more subscribers with a plurality of electronic books containing specifically targeted advertising is provided. The apparatus includes one or more computers or electronic storage devices containing or having access to the contents of two or more books, subscriber target criteria for one or more associated advertisements to be placed in one or more electronic books, information from one or more subscribers interested in receiving or having access to one or more electronic books, and advertising information from one or more advertisers. Upon receiving a request for an electronic book from the one or more subscribers, the one or more computers or electronic storage devices determine or obtain information regarding which of the subscribers' target criteria for one or more associated advertisements are satisfied by the information from the one or more subscribers that requested the electronic book and select and insert or have inserted the one or more associated advertisements having satisfied subscriber target criteria into an electronic book and provide or giving access to the requested electronic book containing the associated advertising to the one or more subscribers that requested the electronic book.

In yet another aspect of at least one embodiment of the present disclosure, the information contained in the one or more computers or electronic storage devices includes any information that would be of interest to an advertiser, content provider or providers of the electronic book or their affiliates. Examples of information that could be contained include but are not limited to the subscriber's name, address, email address, age, gender, verification or billing information (e.g., credit card, social security, banking, or credit information), race, educational status, educational history, employment status, employment history, past or present employment duties, activities, viewing preferences, listening preferences, reading preferences, hobbies, food preferences, beverage preferences, email preferences, and agreement to or acceptance of one or more licensing agreements regarding their use of the electronic book providers products and services.

In yet another exemplary embodiment of the present disclosure, a method of preventing advertising fraud in advertising provided in electronic books is provided. The method includes 1) providing or giving access to one or more electronic books containing one or more electronic advertisements having the ability to display or link to additional or related information about the advertisement to a subscriber, 2) providing the ability to limit or limiting the number of times the subscriber can receive any one advertisement in one or more electronic books to a particular number and 3) providing the ability to limit or limiting the number of times any one subscriber can click on the advertisement in one or more electronic books to access the additional or related information about the advertisement.

In one aspect of at least one embodiment of the present disclosure, the advertisement contains a hyperlink to a webpage that, when selected or clicked by the subscriber, retrieves additional or related information about the advertisement.

In another aspect of at least one embodiment of the present disclosure, selecting the first set of advertisements for the first electronic book further requires choosing at least one of the one or more advertisements having one or more associated subscriber target criteria that are most closely satisfied by the information from the first subscriber requesting the first electronic book.

In yet another aspect of at least one embodiment of the present disclosure, choosing at least one of the one or more advertisements having one or more associated subscriber target criteria that are satisfied by the information from the first subscriber requesting the first electronic book is done randomly.

In yet another aspect of at least one embodiment of the present disclosure, selecting a first set of advertisements for the first electronic book and inserting the selected first set of advertisements for the first electronic book into the first electronic book are performed in such a way that the first electronic book provided or given access to does not contain the same advertising in the same location as any other electronic book previously provided to or gained access by a subscriber.

In yet another aspect of the at least one embodiment of the present disclosure, the first set of selected advertising and their relative locations in the first electronic book can be used to identify which subscriber or subscribers were provided or given access to the first electronic book.

In yet another aspect of at least one embodiment of the present disclosure, the information received from the subscriber requesting an electronic book includes any information that would be of interest to an advertiser, content provider or providers of the electronic book or their affiliates. Examples of information that could be obtained from subscribers includes, but is not limited to, the subscriber's name, address, email address, age, gender, verification or billing information (e.g., credit card, social security, banking, or credit information), race, educational status, educational history, employment status, employment history, past or present employment duties, activities, viewing preferences, listening preferences, reading preferences, hobbies, food preferences, beverage preferences, email preferences, and agreement to or acceptance of one or more licensing agreements regarding their use of the electronic book providers' products and services.

In yet another aspect of at least one embodiment of the present disclosure, the electronic books that are provided are textbooks.

In yet another aspect of at least one embodiment of the present disclosure, the information from a first subscriber interested in receiving one or more electronic books includes the subscriber's name, address, email address, age and gender.

In yet another aspect of at least one embodiment of the present disclosure, the advertisements in the electronic book contain a notification to the subscriber who requested the electronic book that he or she has won an incentive.

In yet another aspect of at least one embodiment of the present disclosure, in order for the subscriber to receive any incentive he or she has won, the subscriber must provide or verify certain information or perform certain acts.

In yet another aspect of at least one embodiment of the present disclosure, the electronic books each contain the name of the subscriber who requested the electronic book.

In yet another aspect of at least one embodiment of the present disclosure, the electronic book contains one or more unique serial numbers, bar codes, images or other identifying information that may or may not be visible to the first subscriber that can be used to identify the first subscriber.

In yet another aspect of at least one embodiment of the present disclosure, selecting the first and second set of advertisements for the first and second electronic books further requires choosing at least one of the one or more advertisements having one or more associated subscriber target criteria that are most closely satisfied by the information from the first and second subscribers requesting the first and second electronic books respectively.

In yet another aspect of at least one embodiment of the present disclosure, selecting a first set of advertisements for the first electronic book and inserting the selected first set of advertisements for the first electronic book into the first electronic book are performed in such a way that the first electronic book provided or given access to does not contain the same advertising in the same location of the electronic book as any other electronic book previously provided to or gained access by a subscriber and selecting a second set of advertisements for the second electronic book and inserting the selected second set of advertisements for the second electronic book into the second electronic book are performed in such a way that the second electronic book provided or given access to does not contain the same advertising in the same location of the electronic book as any other electronic book previously provided to or gained access by a subscriber.

In yet another aspect of at least one embodiment of the present disclosure, the first set of selected advertising and their relative locations in the first electronic book and the second set of selected advertising and their relative locations in the second electronic book can be used to identify which subscribers were provided or given access to the first and second electronic books.

In yet another aspect of at least one embodiment of the present disclosure, at least one of the advertisements in the first electronic book, the second electronic book or the first and second electronic books provided or given access to contains a notification that the subscriber or subscribers who requested the electronic books have won an incentive.

In yet another aspect of at least one embodiment of the present disclosure, the first electronic book contains the name of the first subscriber who requested the electronic book and the second electronic book contains the name of the second subscriber who requested the electronic book.

In yet another aspect of at least one embodiment of the present disclosure, the first and second electronic books each contain one or more unique serial numbers, bar codes, images or other identifying information that may or may not be visible to the first or second subscriber that can be used to reveal the identity of the first and second subscriber or other important information about the creation or dissemination of the first and second electronic book.

In yet another aspect of at least one embodiment of the present disclosure, the selected first and second set of selected advertisements contain one or more additional advertisements that cannot be viewed by the first or second subscriber respectively until a predefined event occurs and the first and second set of selected advertisements have the ability to display or link to additional or related information about the advertisement.

DRAWINGS

The above-mentioned features and objects of the present disclosure will become more apparent with reference to the following description taken in conjunction with the accompanying drawings wherein like reference numerals denote like elements and in which:

FIG. 2 shows, in accordance with at least one embodiment of the present disclosure, a webpage showing search results and other related information obtained after performing a search for electronic books that can be downloaded or given access to.

Figure 3:
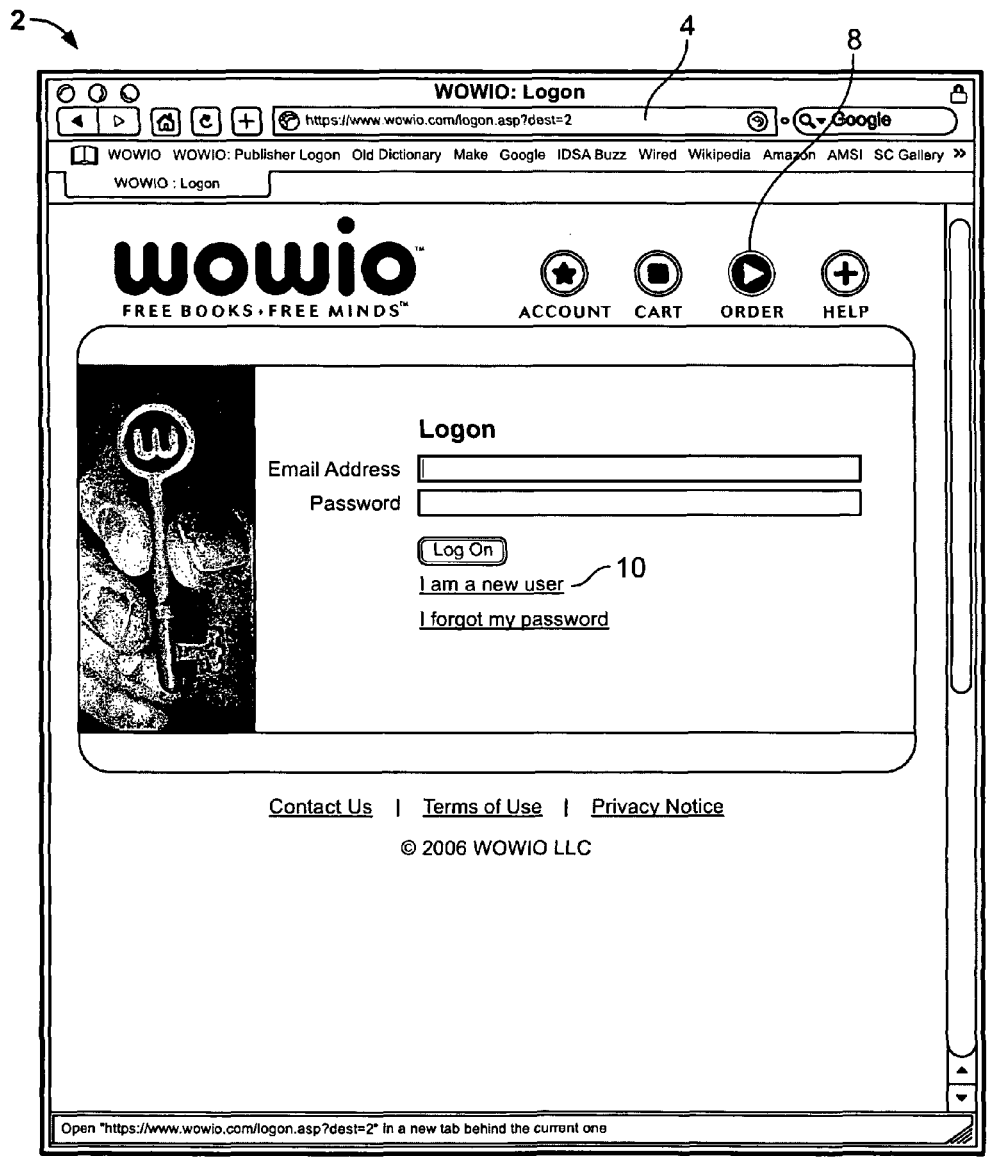

FIG. 3 shows, in accordance with at least one embodiment of the present disclosure, a webpage that allows subscribers to login and use different features and advantages of the website (e.g., download electronic books) and obtain important subscriber information (e.g., password) and allows those individuals interested in becoming subscribers with the ability to begin the process of becoming subscribers.

Figure 4:
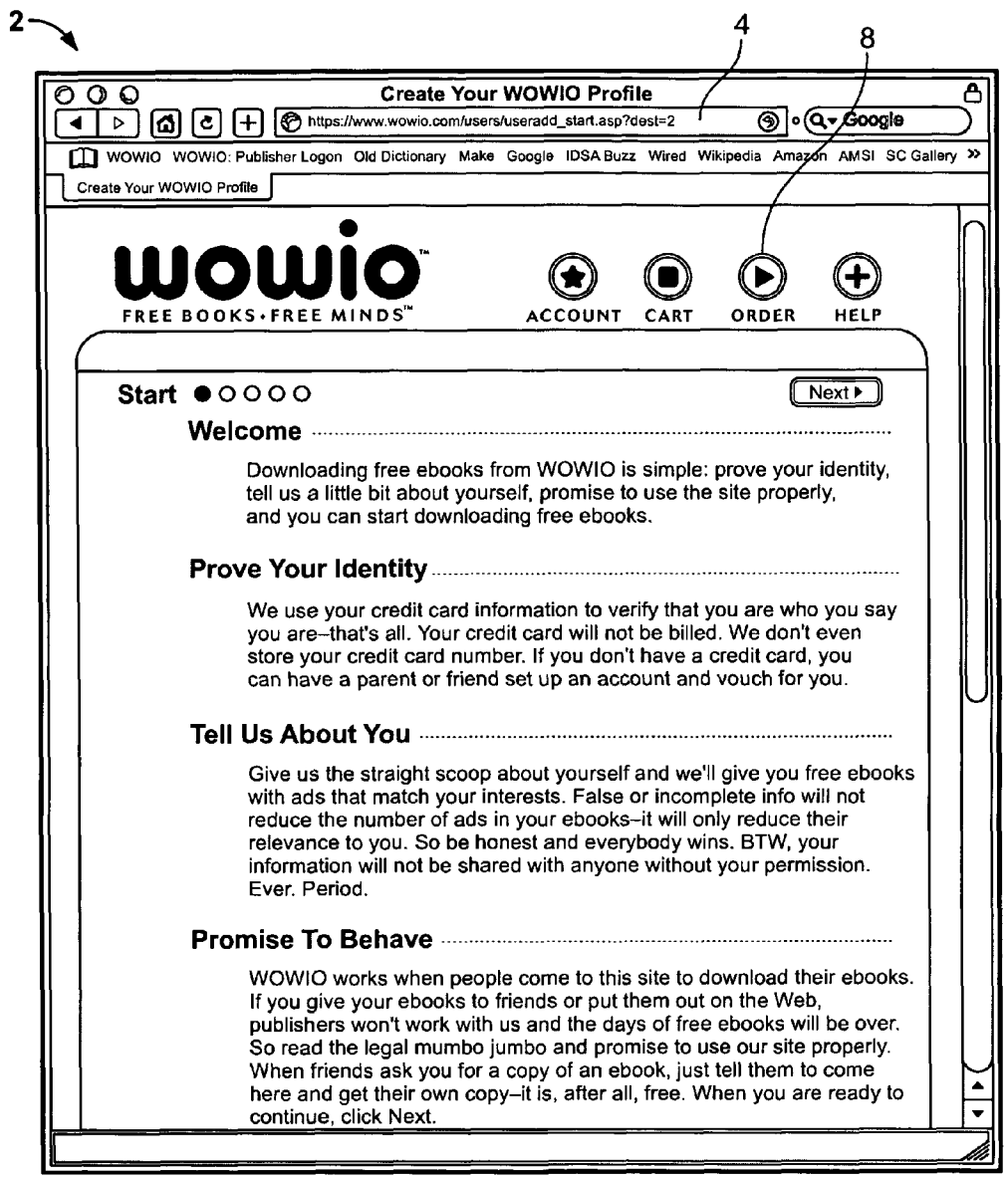

FIG. 4 shows, in accordance with at least one embodiment of the present disclosure, a webpage describing the registration process and basic rules of using the products and services provided by the electronic book provider.

FIG. 5 shows, in accordance with at least one embodiment of the present disclosure, a webpage that requests, as part of the registration process, contact, verification, code and referral information from individuals wanting to become subscribers and download electronic books.

Figure 6:
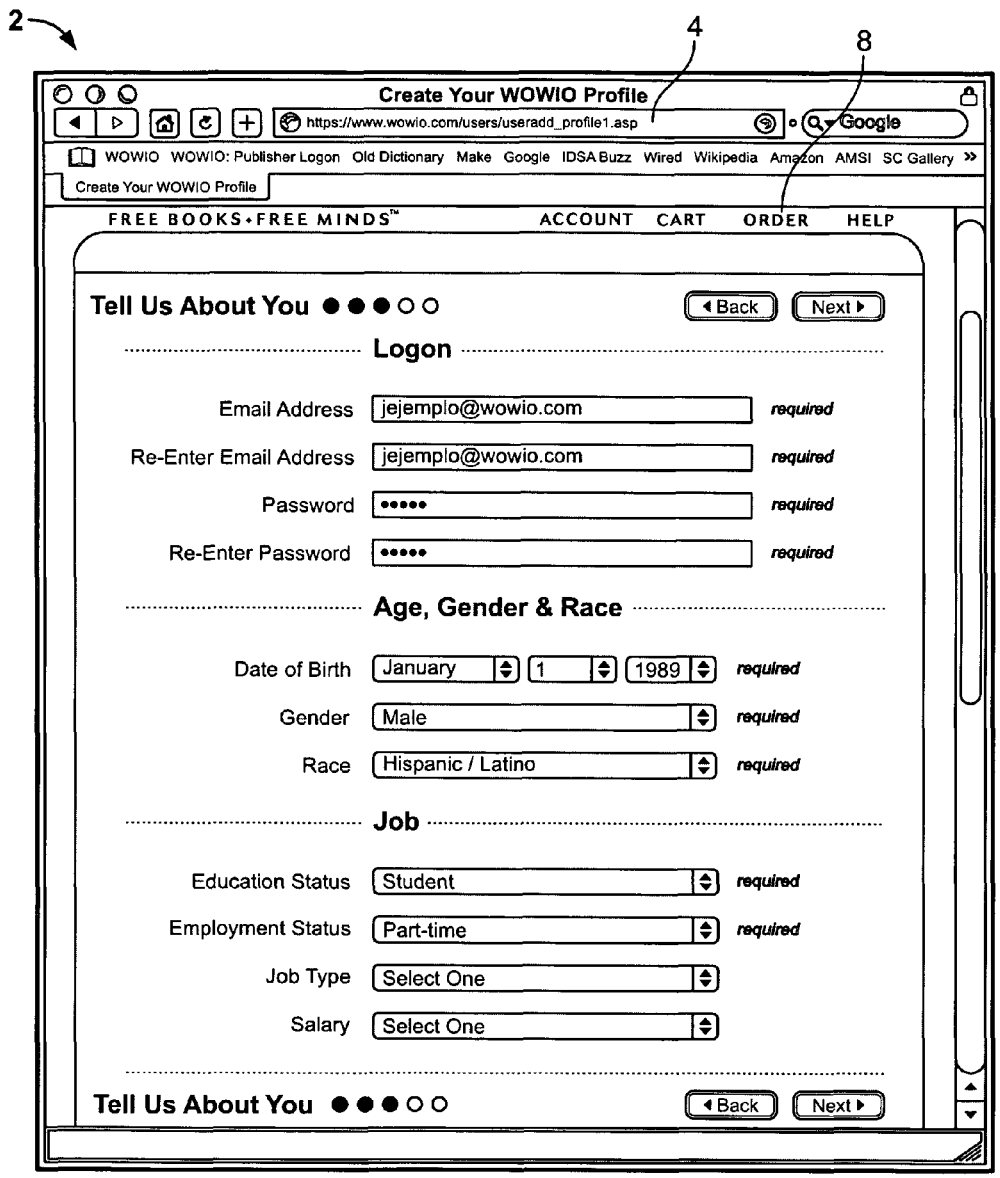

FIG. 6 shows, in accordance with at least one embodiment of the present disclosure, a webpage that requests, as part of the registration process, logon, age, gender, race and employment information from individuals wanting to become subscribers and download electronic books.

FIG. 7A shows, in accordance with at least one embodiment of the present disclosure, a part of a webpage that requests, as part of the registration process, education and activities information from individuals wanting to become subscribers and download electronic books.

FIG. 7B shows, in accordance with at least one embodiment of the present disclosure, another part of a webpage that requests, as part of the registration process, education and activities information from individuals wanting to become subscribers and download electronic books.

Figure 8:
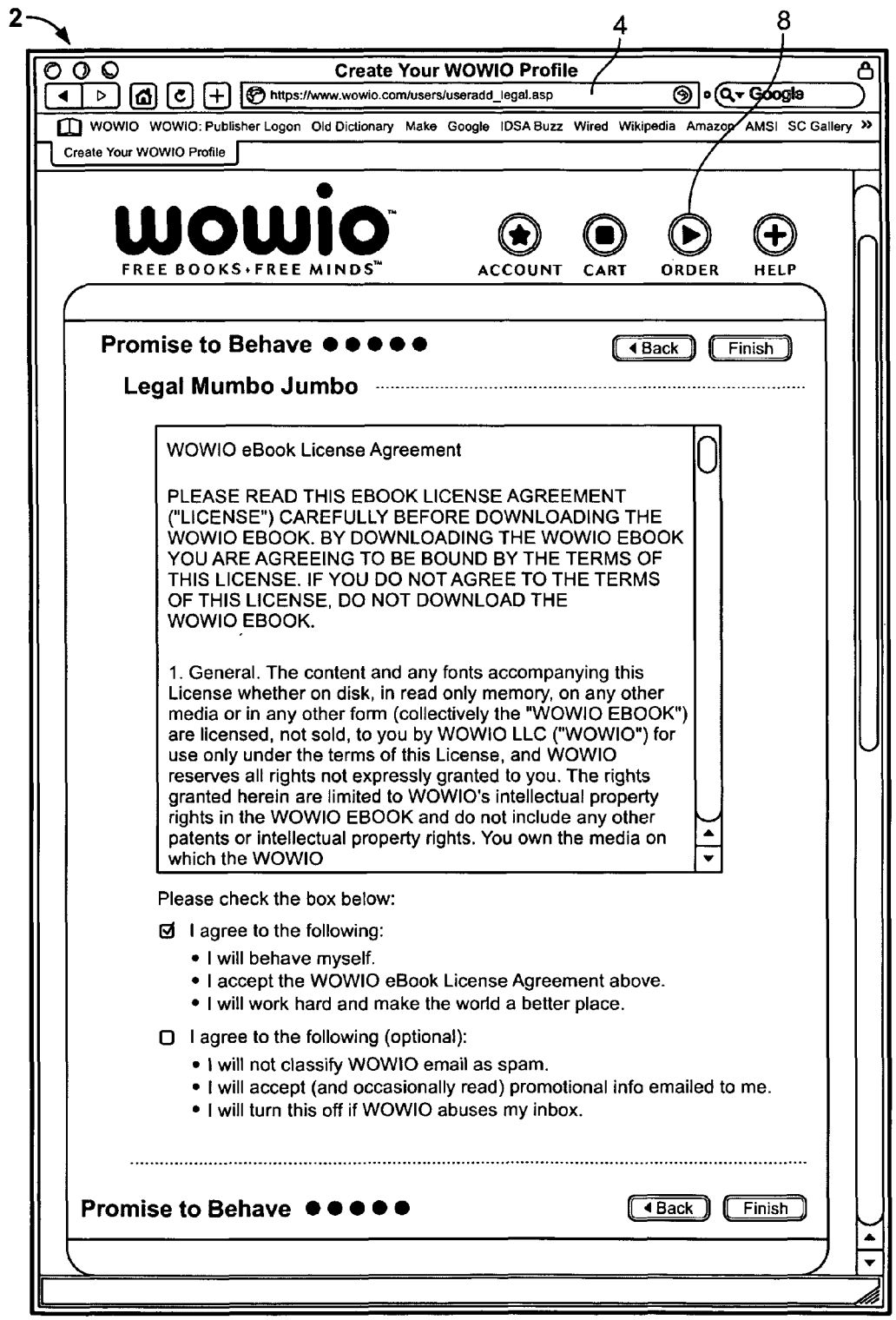

FIG. 8 shows, in accordance with at least one embodiment of the present disclosure, a partial webpage that shows a portion of a sample licensing agreement and other provisions that must be agreed to and accepted by individuals wanting to become subscribers and download electronic books as part of the registration process and other aspects of classifying and accepting emails from the electronic book provider.

Figure 9:
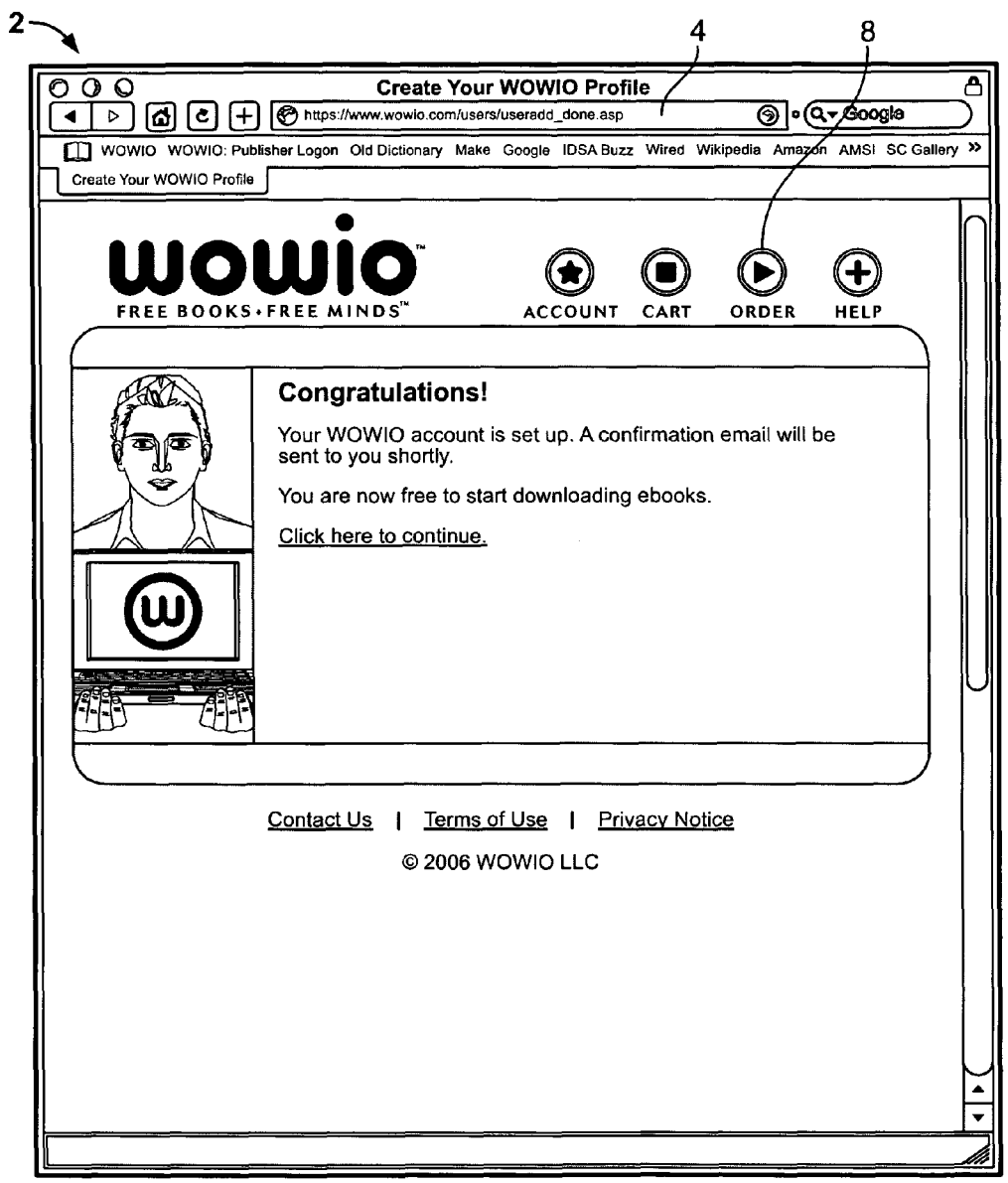

FIG. 9 shows, in accordance with at least one embodiment of the present disclosure, a webpage providing confirmation that the individual having completed the registration process is now a subscriber and is therefore capable of downloading electronic books.

Figure 10:
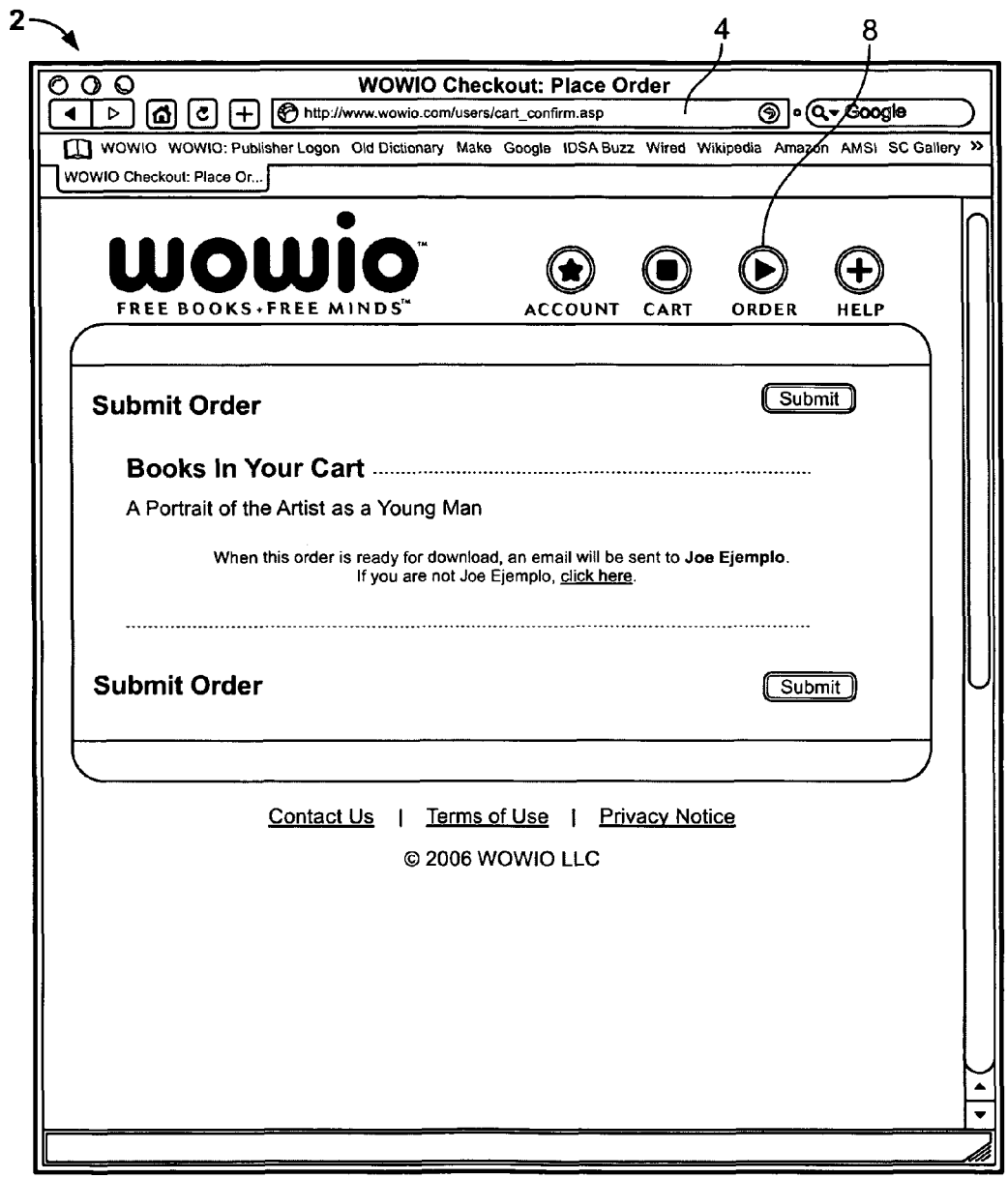

FIG. 10 shows, in accordance with at least one embodiment of the present disclosure, a webpage showing various aspects of ordering checkout, notification and delivery of an electronic book.

Figure 11:
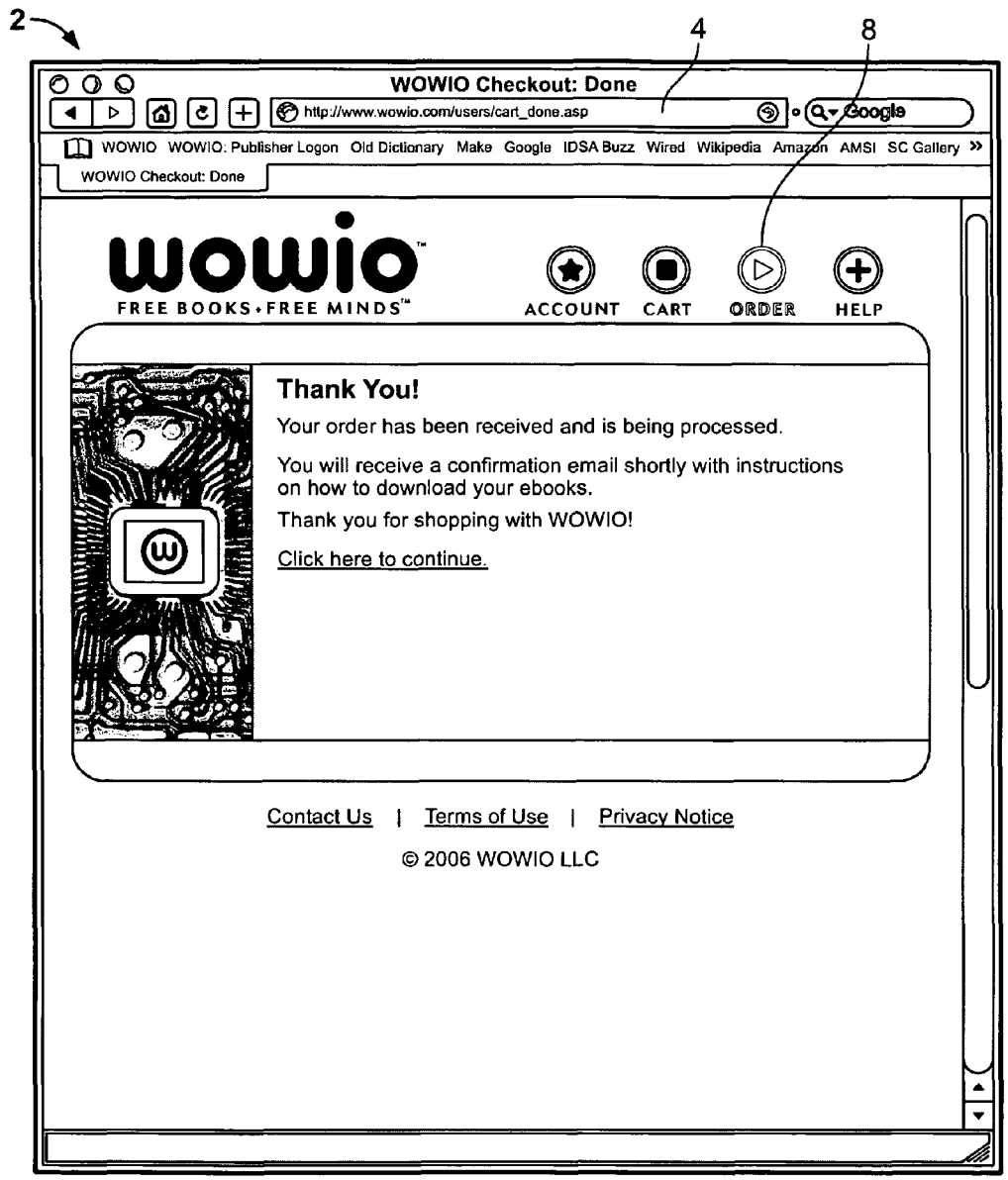

FIG. 11 shows, in accordance with at least one embodiment of the present disclosure, a webpage showing various aspects of the ordering, processing, confirmation and downloading of an electronic book.

Figure 12:
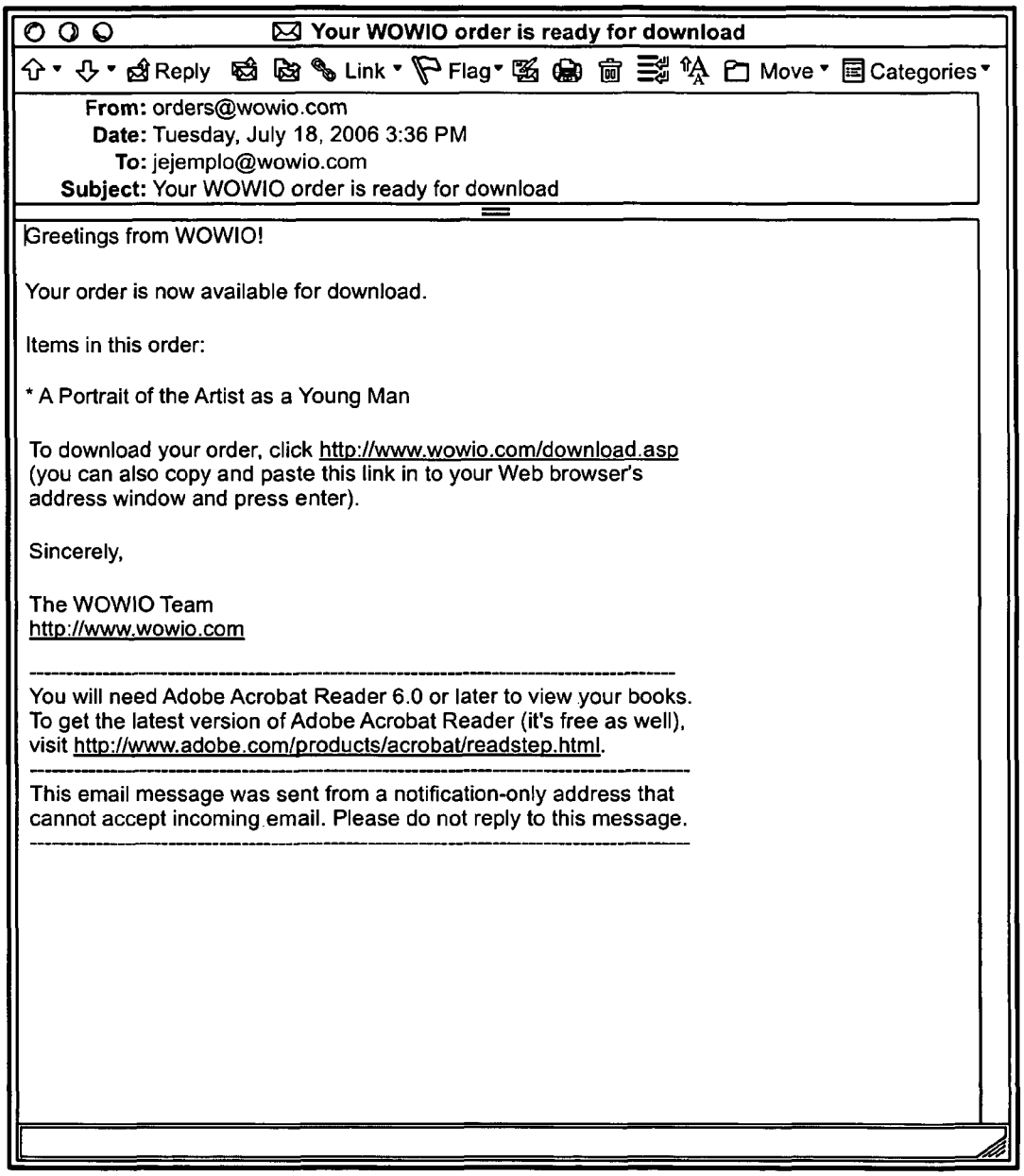

FIG. 12 shows, in accordance with at least one embodiment of the present disclosure, an email sent to a subscriber indicating that the electronic book or books the subscriber requested are available and providing information regarding access to, downloading and viewing of those electronic.

Figure 13:
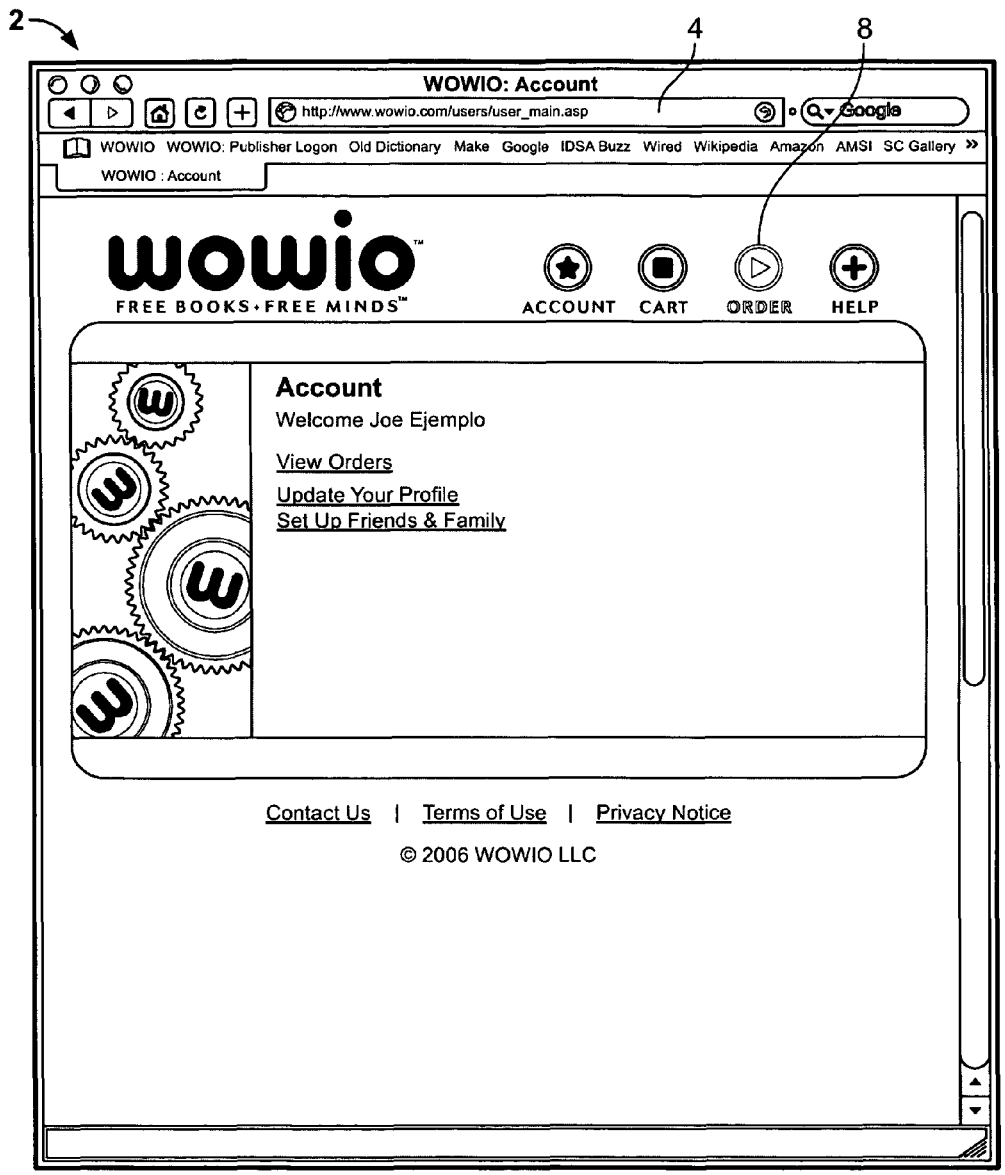

FIG. 13 shows, in accordance with at least one embodiment of the present disclosure, a webpage where subscribers can modify or select various account preferences including updating their account information, viewing orders, or providing information regarding friends and family who can use, through the use of an access code or otherwise, the subscriber's account to obtain electronic books.

Figure 14:
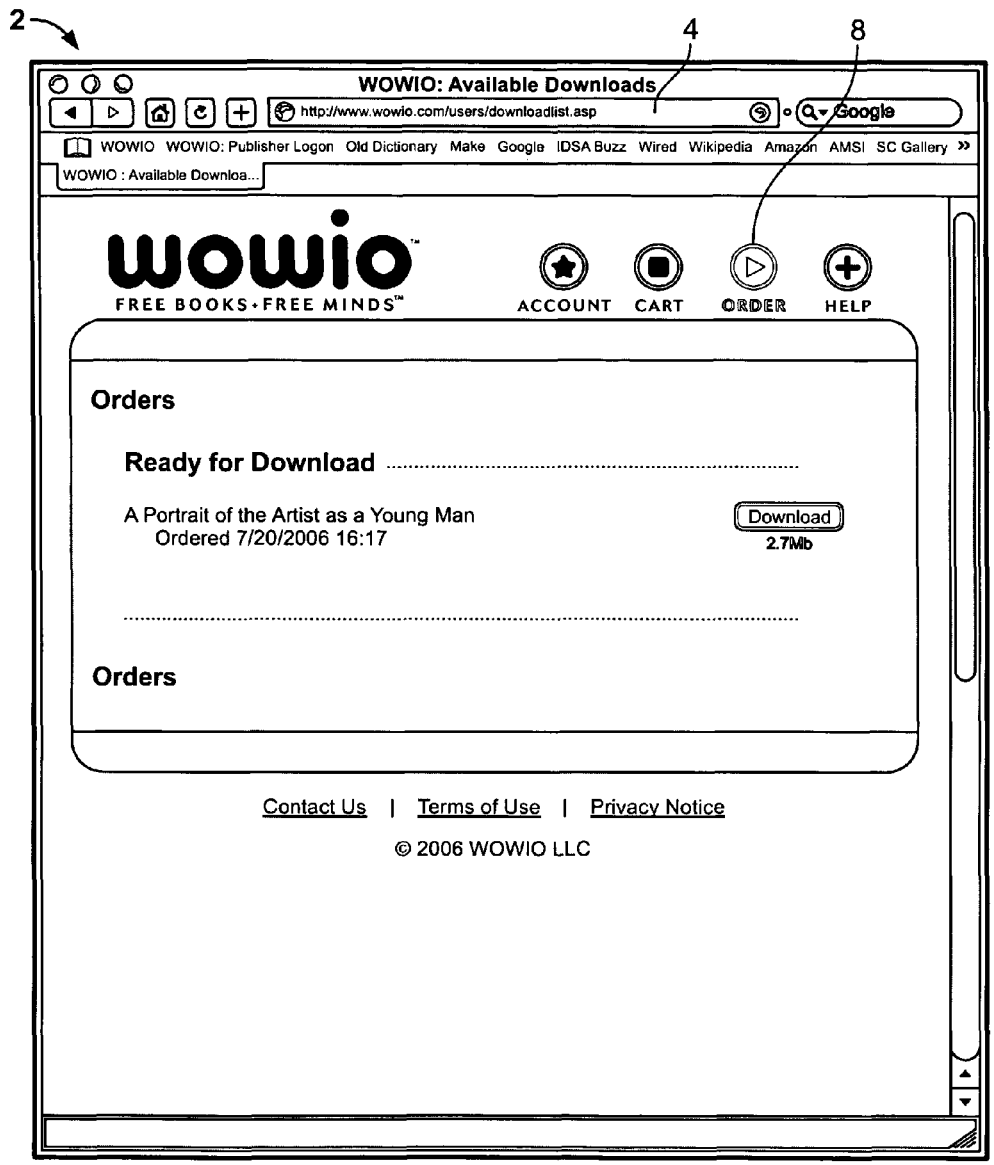

FIG. 14 shows, in accordance with at least one embodiment of the present disclosure, a webpage showing various aspects of downloading an electronic book ordered by a subscriber.

Figure 15:
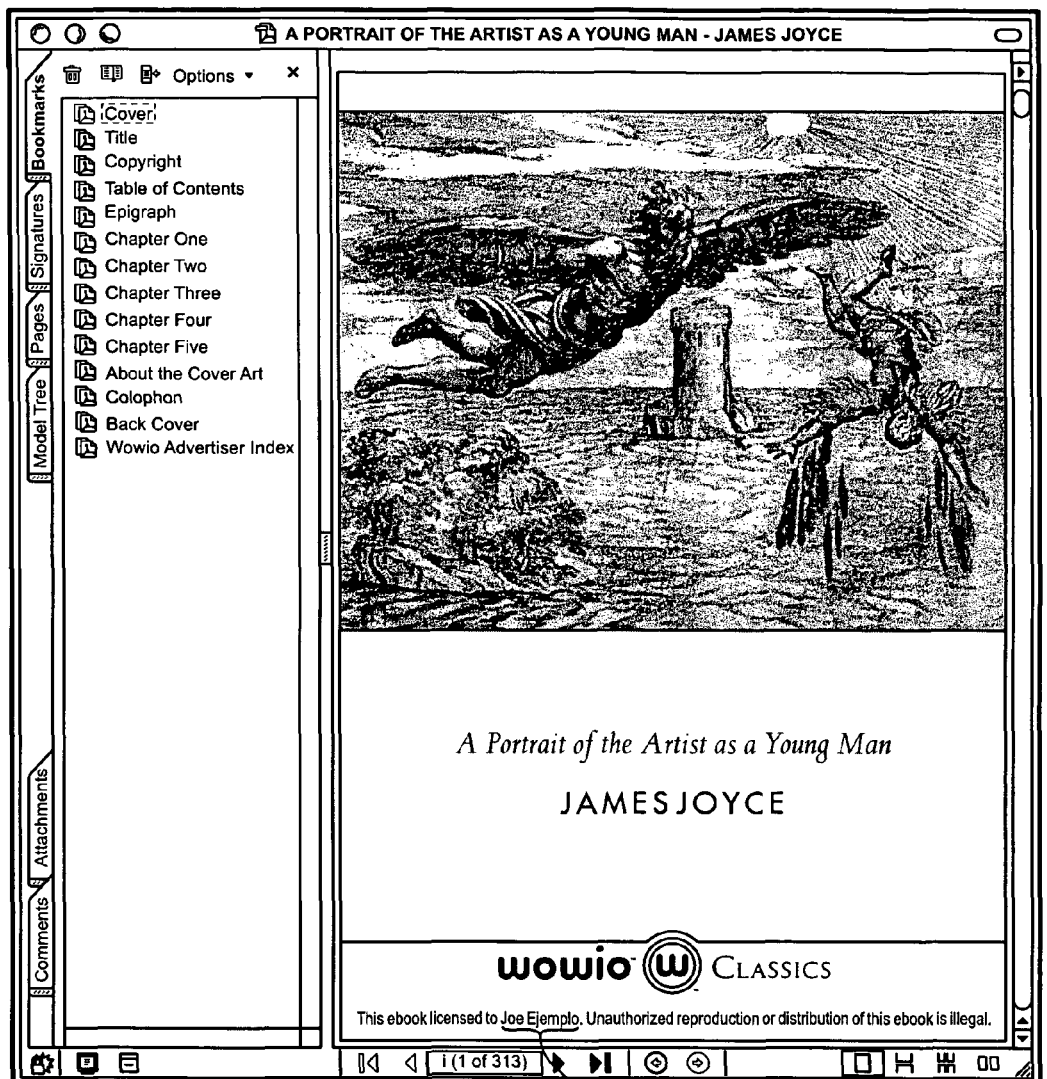

FIG. 15 shows, in accordance with at least one embodiment of the present disclosure, a page of an electronic book and the bookmarks associated with the electronic book as viewed using an electronic document reader.

Figure 16:

FIG. 16 shows, in accordance with at least one embodiment of the present disclosure, another page of an electronic book containing an advertisement and the bookmarks associated with the electronic book as viewed using an electronic document reader.

Figure 17:
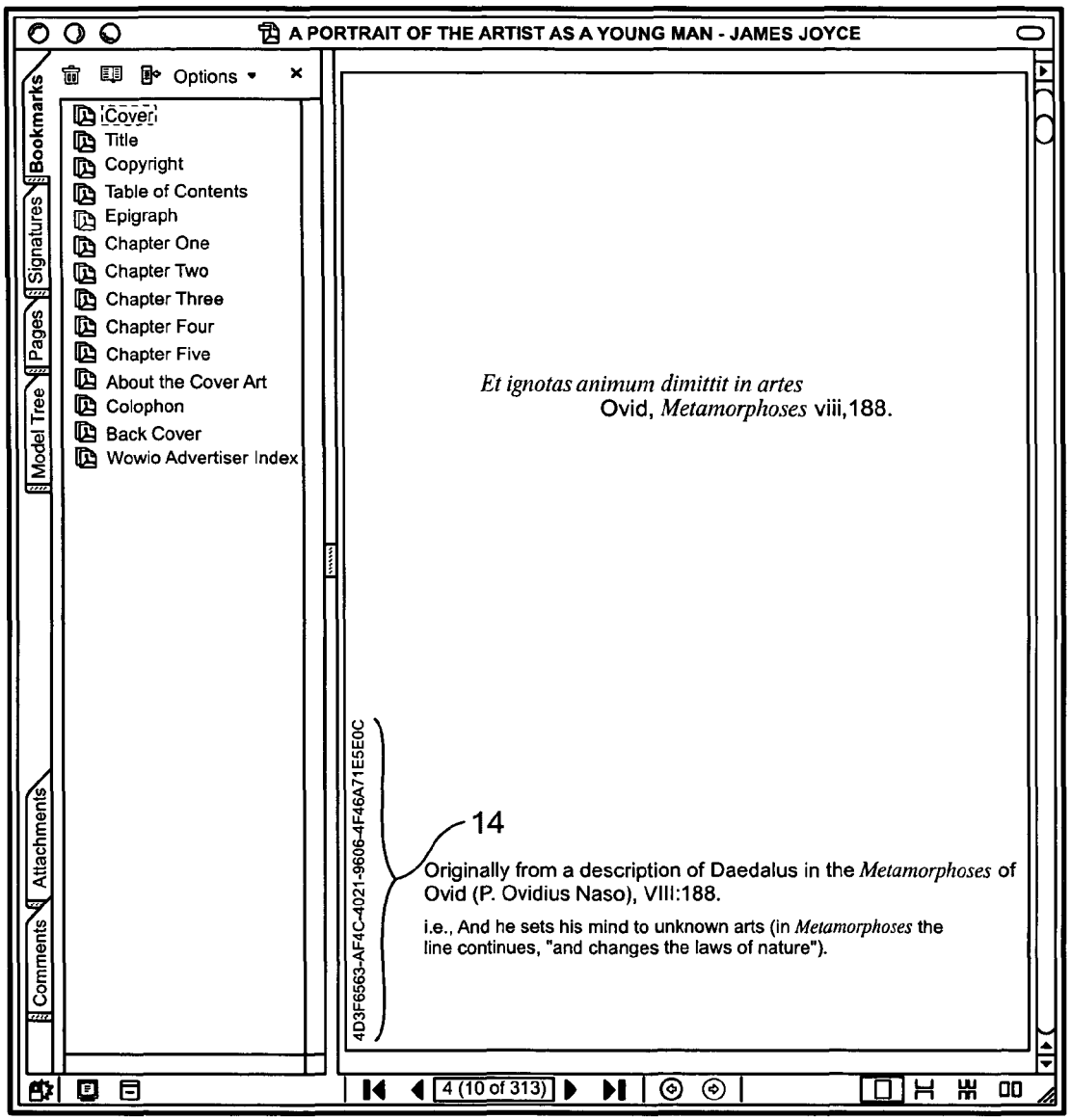

FIG. 17 shows, in accordance with at least one embodiment of the present disclosure, another page of an electronic book containing an identification code that helps prevent the illegal or unwanted dissemination of the electronic book and bookmarks associated with the electronic book as viewed using an electronic document reader.

Figure 18:
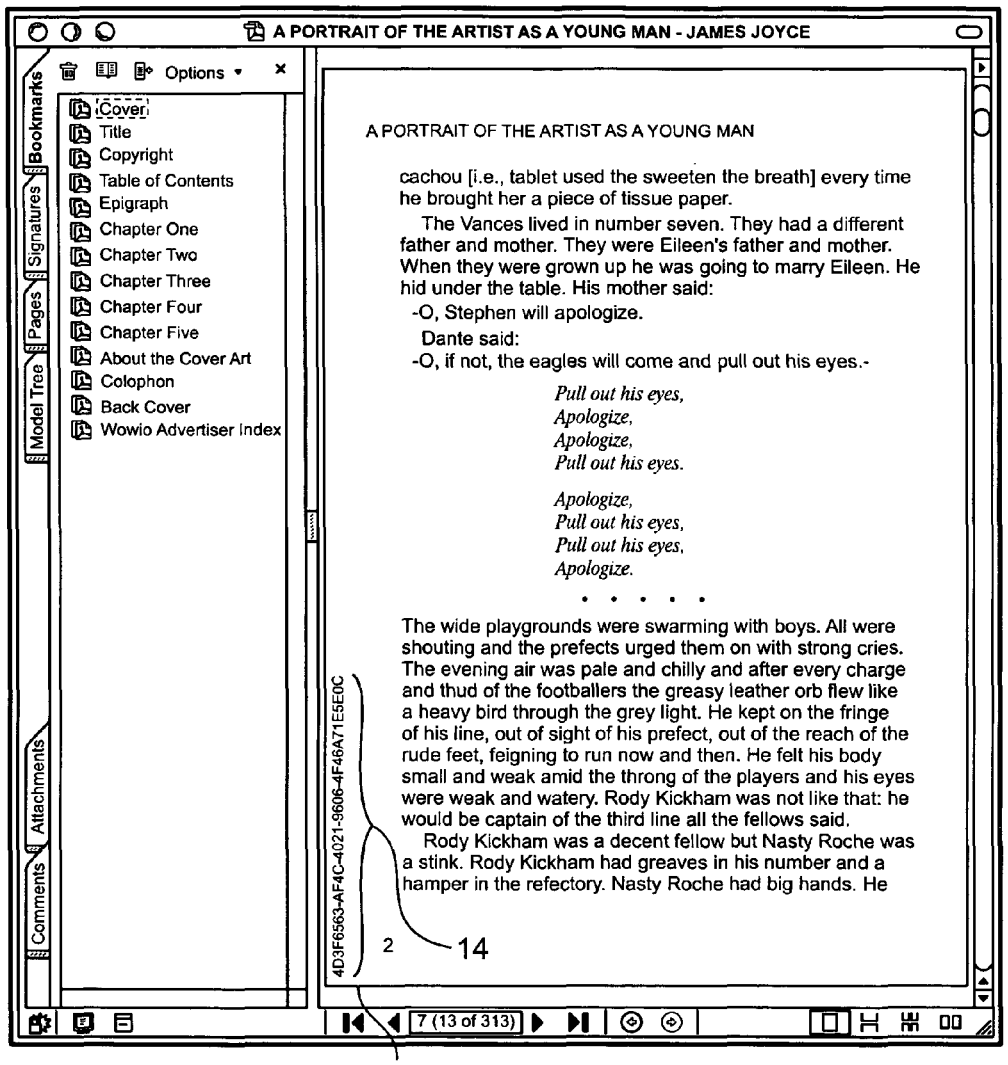

FIG. 18 shows another page of an electronic book containing an identification code that helps prevent the illegal or unwanted dissemination of the electronic book and bookmarks associated with the electronic book as viewed using an electronic document reader in accordance with at least one embodiment of the present disclosure.

Figure 19:
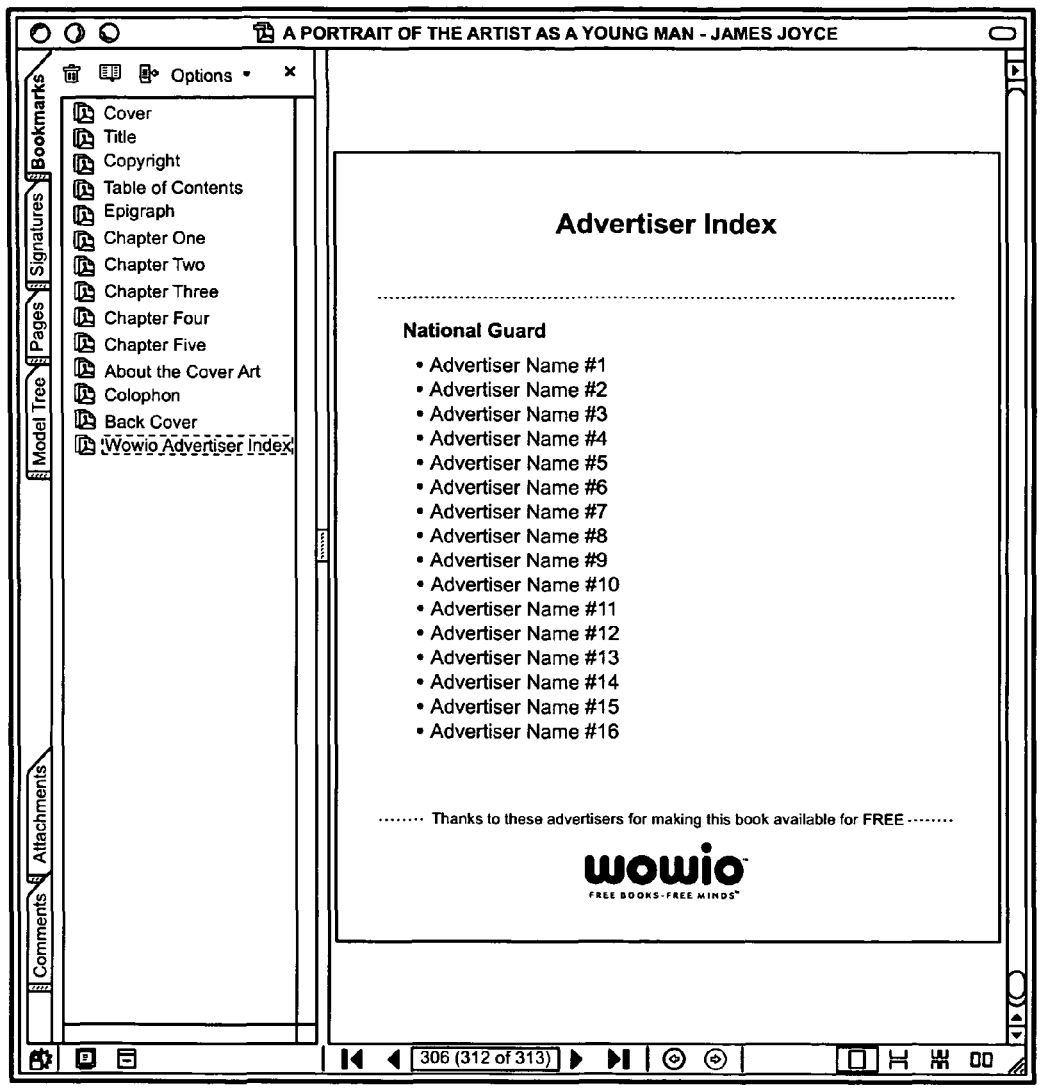

FIG. 19 shows another page of an electronic book containing an advertiser's index that helps improve the content of the electronic book provided and makes it easier for subscribers to find and go to any particular advertisement in accordance with at least one embodiment of the present disclosure.

Figure 20:
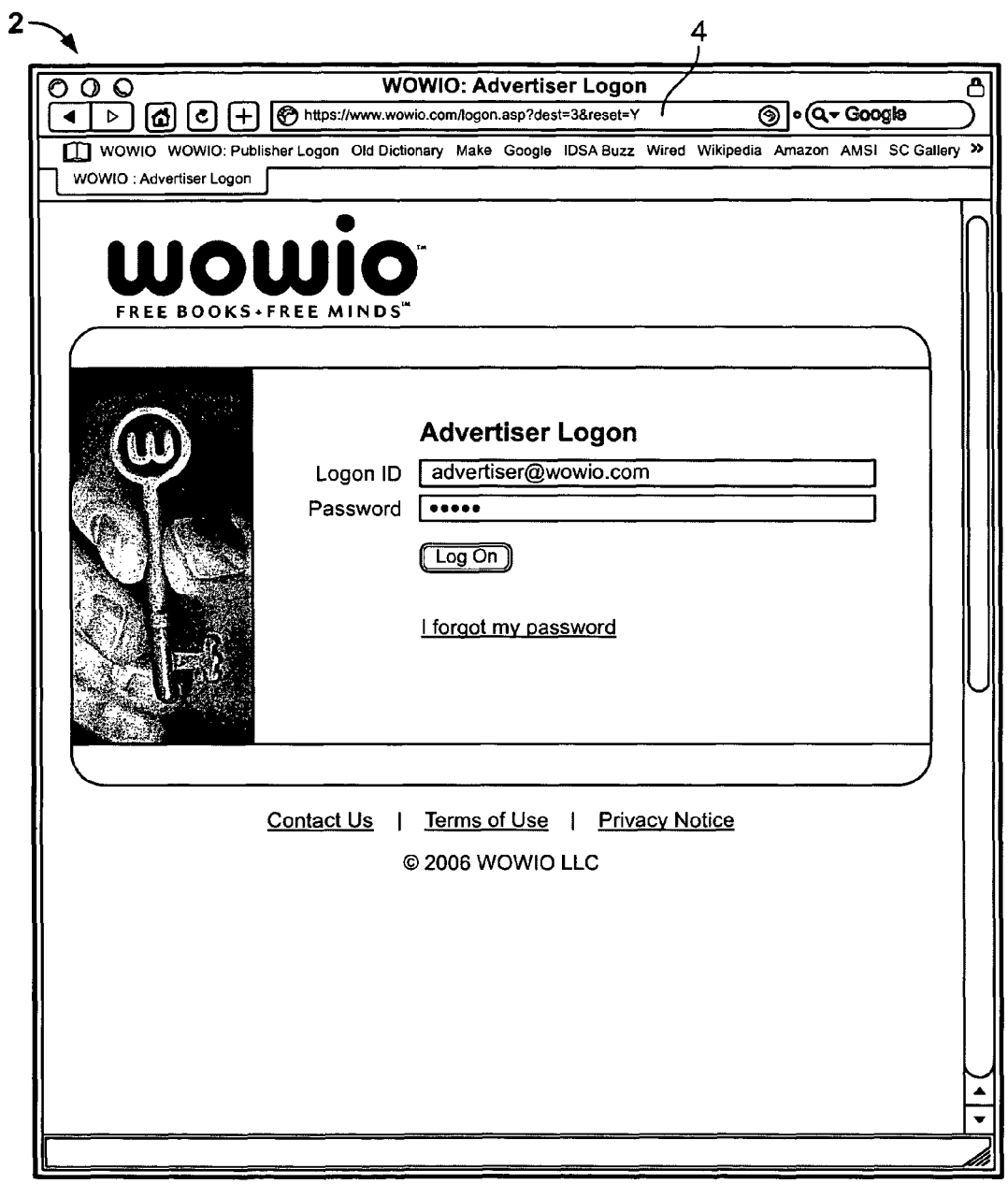

FIG. 20 shows, in accordance with at least one embodiment of the present disclosure, a webpage where advertisers interested in placing advertising in electronic books can login to access.

Figure 21:
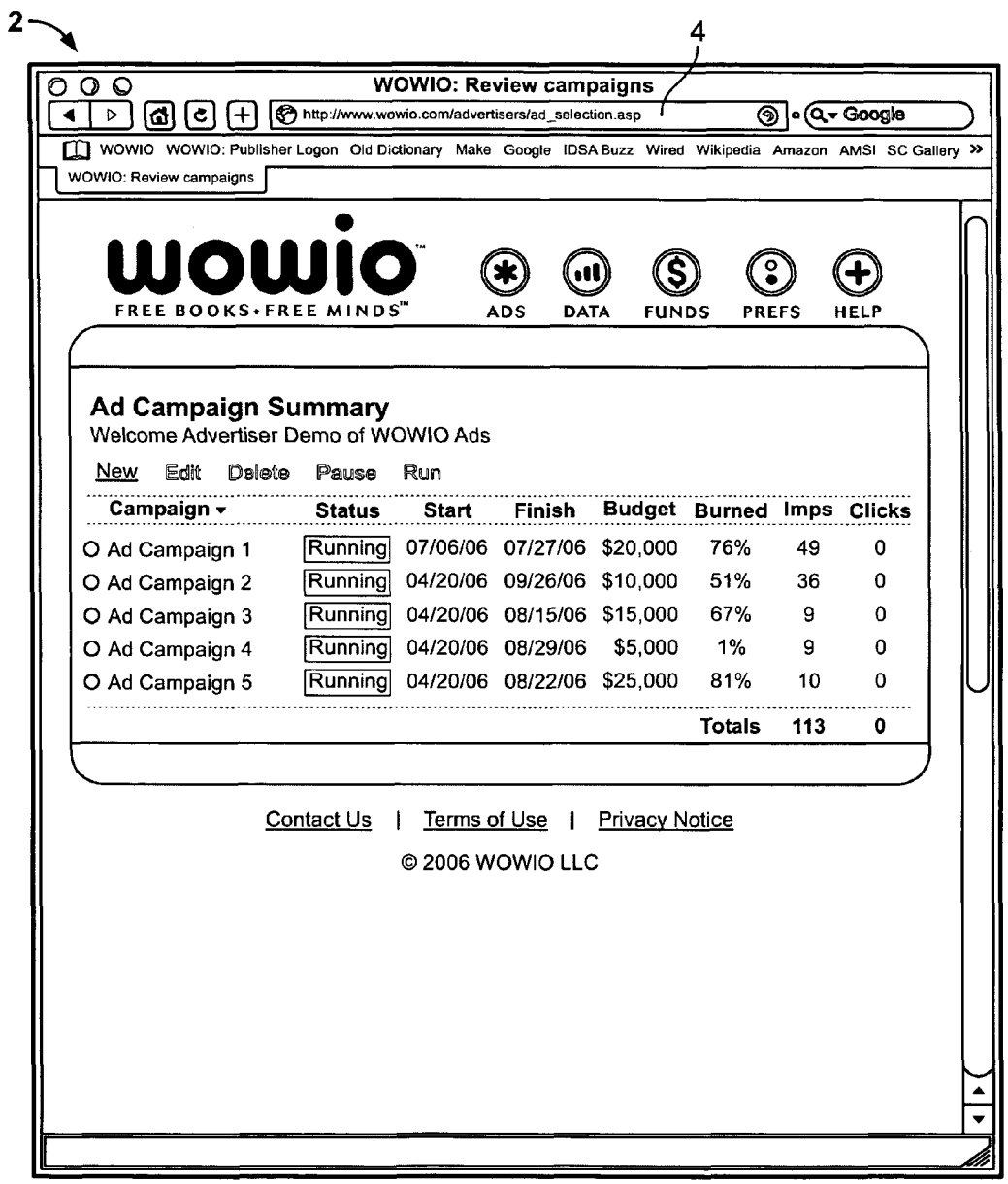

FIG. 21 shows, in accordance with at least one embodiment of the present disclosure, a webpage where advertisers can view important information and statistics and modify various aspects of their advertising campaigns.

Figure 22:
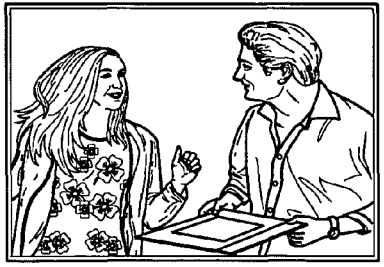

FIG. 22 shows, in accordance with at least one embodiment of the present disclosure, a webpage where information regarding the advertiser's advertising campaign is requested from the advertiser.

FIG. 23 shows, in accordance with at least one embodiment of the present disclosure, a webpage showing information requested from advertisers identifying the advertiser's subscriber target criteria.

Figure 24A:
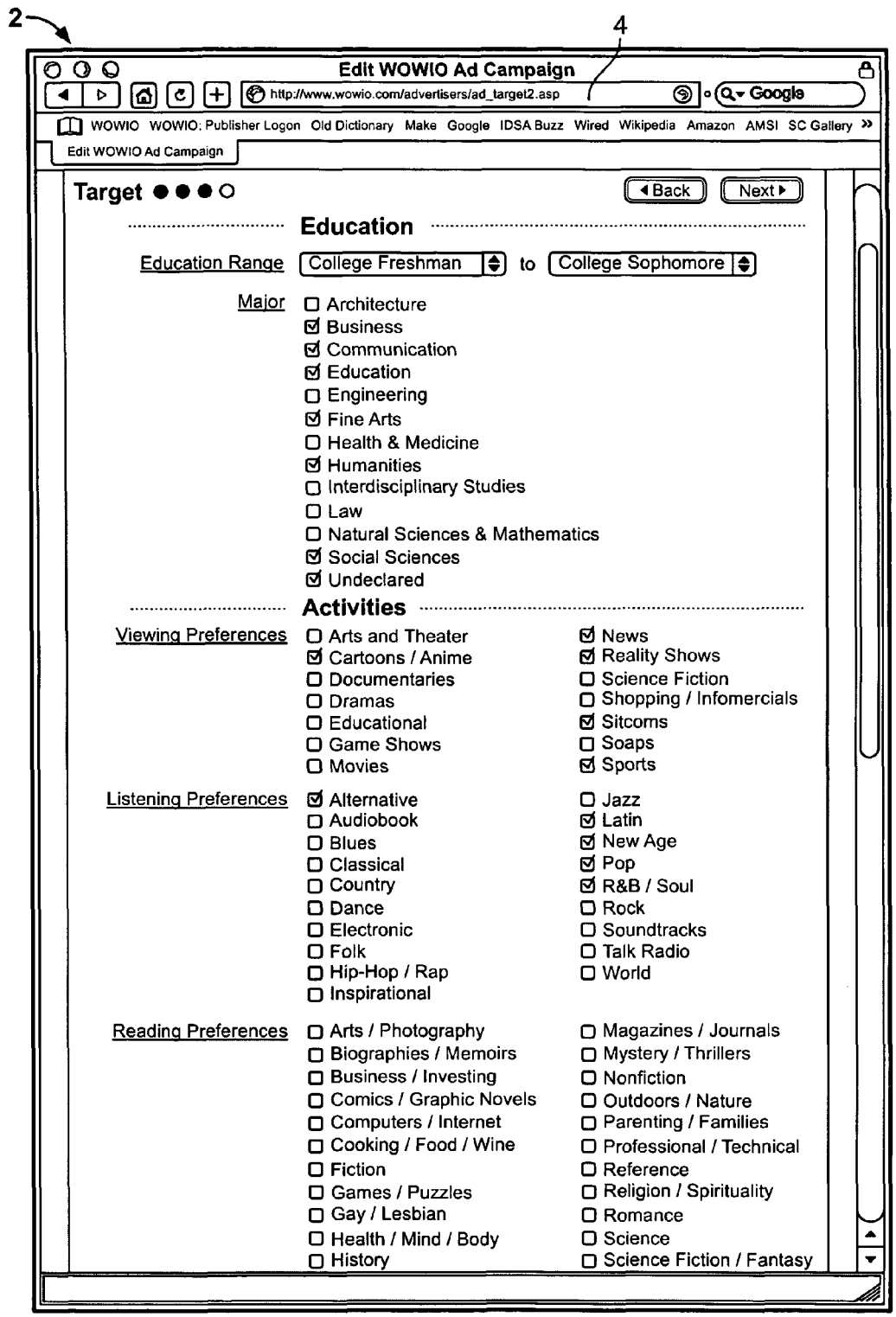

FIG. 24A shows, in accordance with at least one embodiment of the present disclosure, a part of a webpage showing information requested from advertisers identifying the advertisers' subscriber target criteria for one or more campaigns.

Figure 24B:
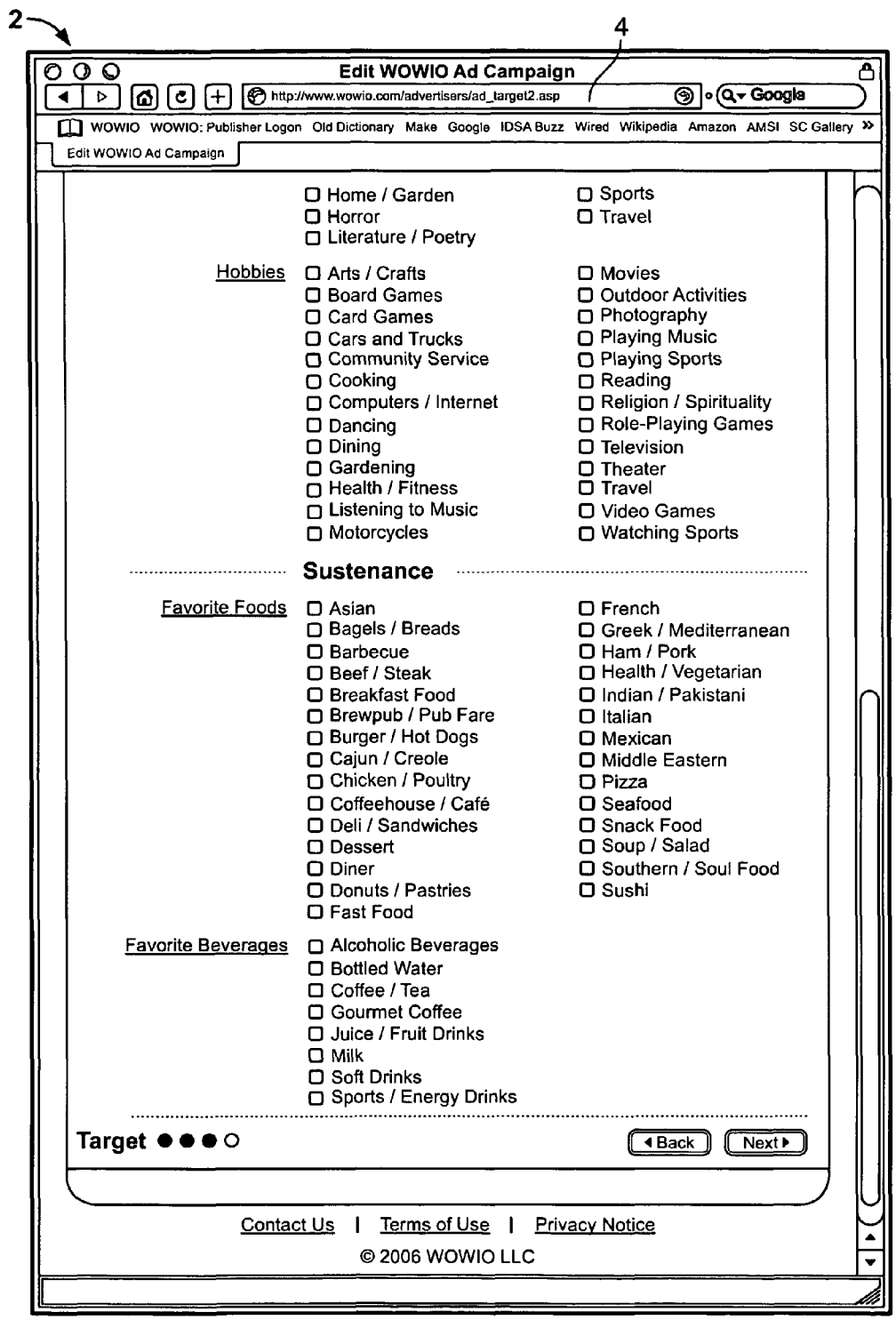

FIG. 24B shows, in accordance with at least one embodiment of the present disclosure, another part of a webpage showing information requested from advertisers identifying the advertisers' subscriber target criteria for one or more campaigns.

FIG. 25 shows, in accordance with at least one embodiment of the present disclosure, a webpage showing the information requested from advertisers identifying the advertiser's subscriber target criteria.

Figure 26:
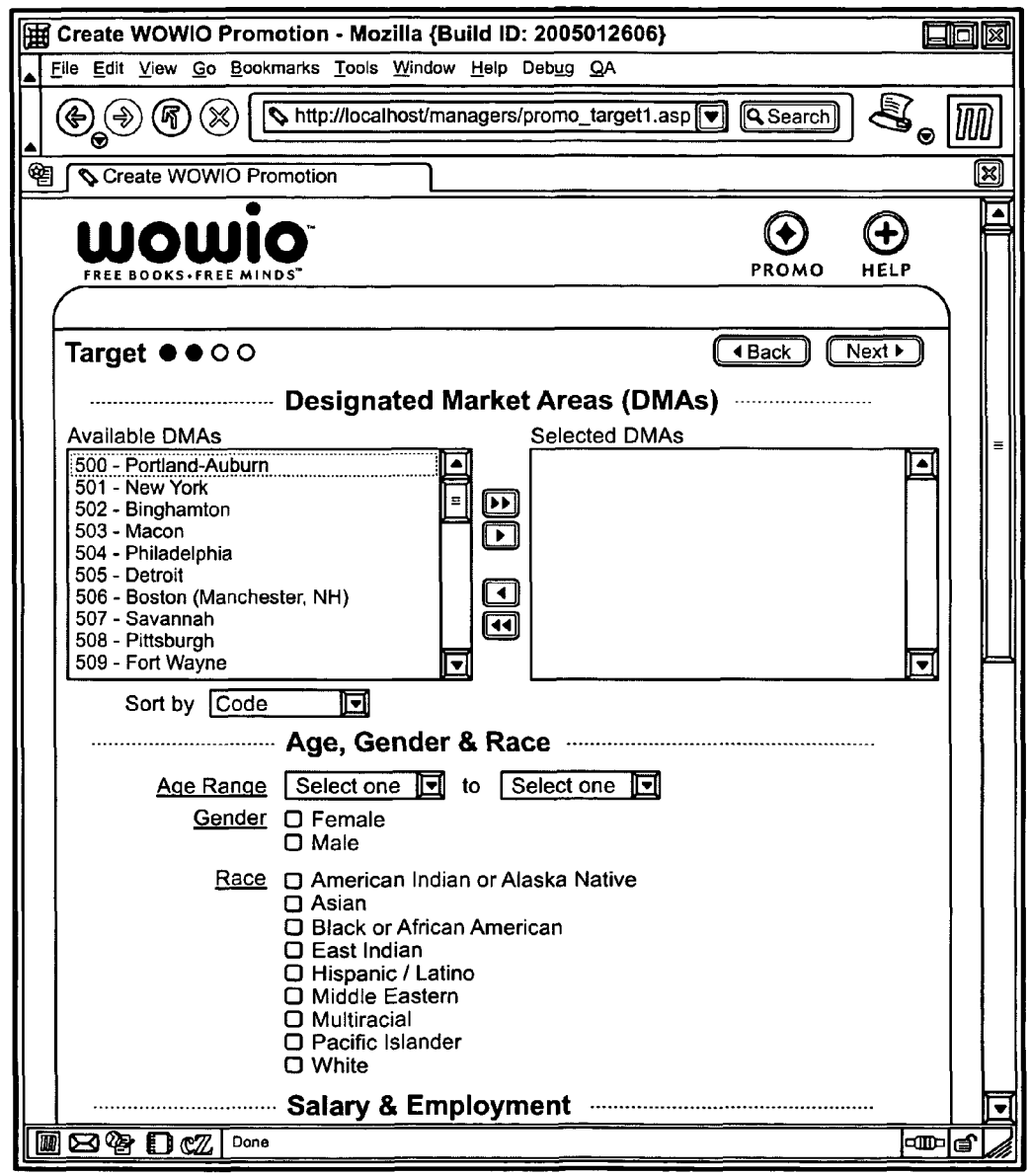

FIG. 26 shows, in accordance with at least one embodiment of the present disclosure, a webpage showing the incentive or promotion information requested when creating an incentive for subscribers reading the electronic books.

Figure 27:
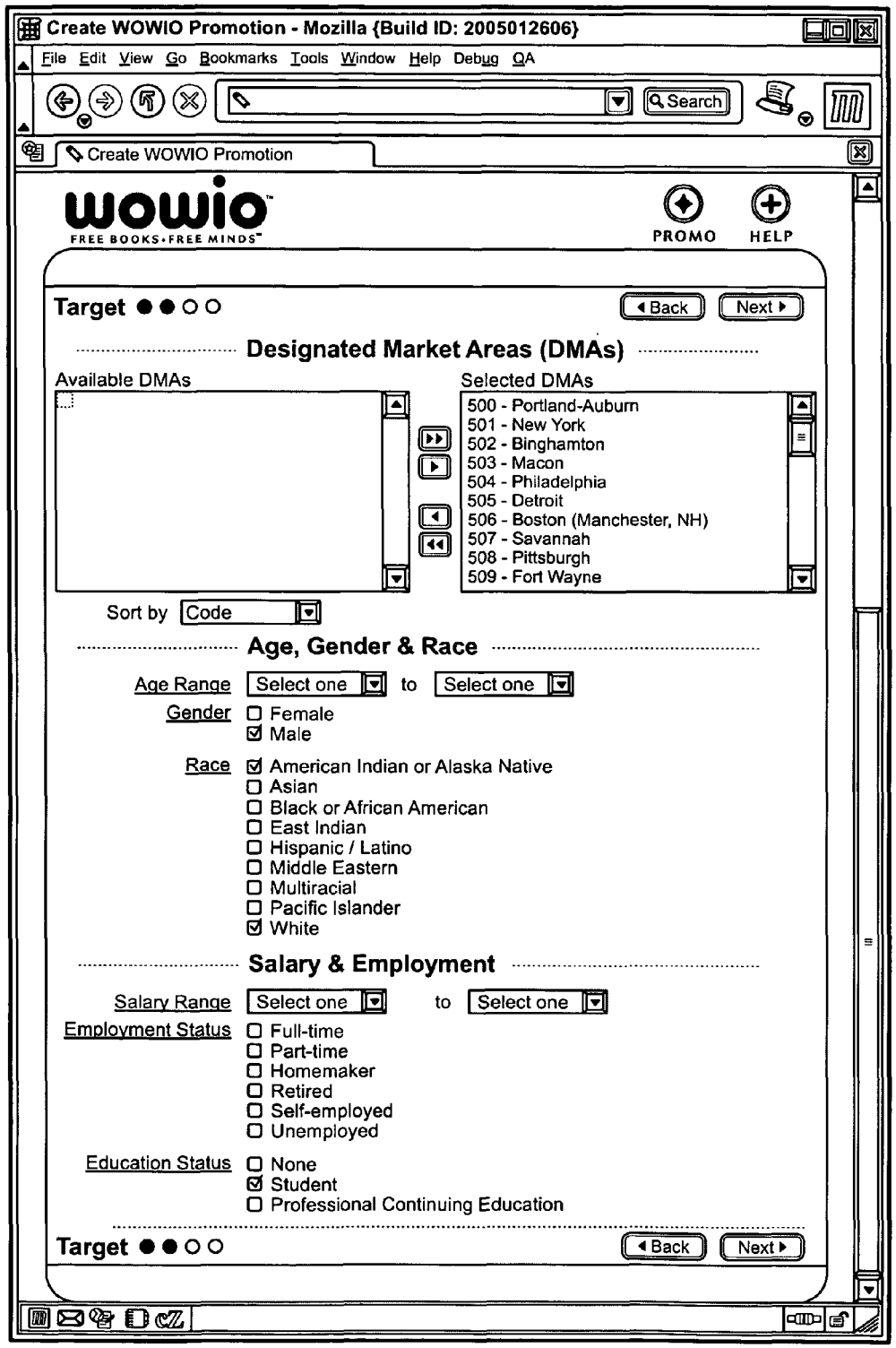

FIG. 27 shows, in accordance with at least one embodiment of the present disclosure, a webpage showing the subscriber target criteria requested when creating an incentive for subscribers reading the electronic books.

FIG. 28A shows, in accordance with at least one embodiment of the present disclosure, a part of a webpage showing additional subscriber target criteria requested when creating an incentive for subscribers reading the electronic books.

FIG. 28B shows, in accordance with at least one embodiment of the present disclosure, another part of a webpage showing yet additional subscriber target criteria requested when creating an incentive promotion, incentive or prize for subscribers reading the electronic books.

Figure 29:
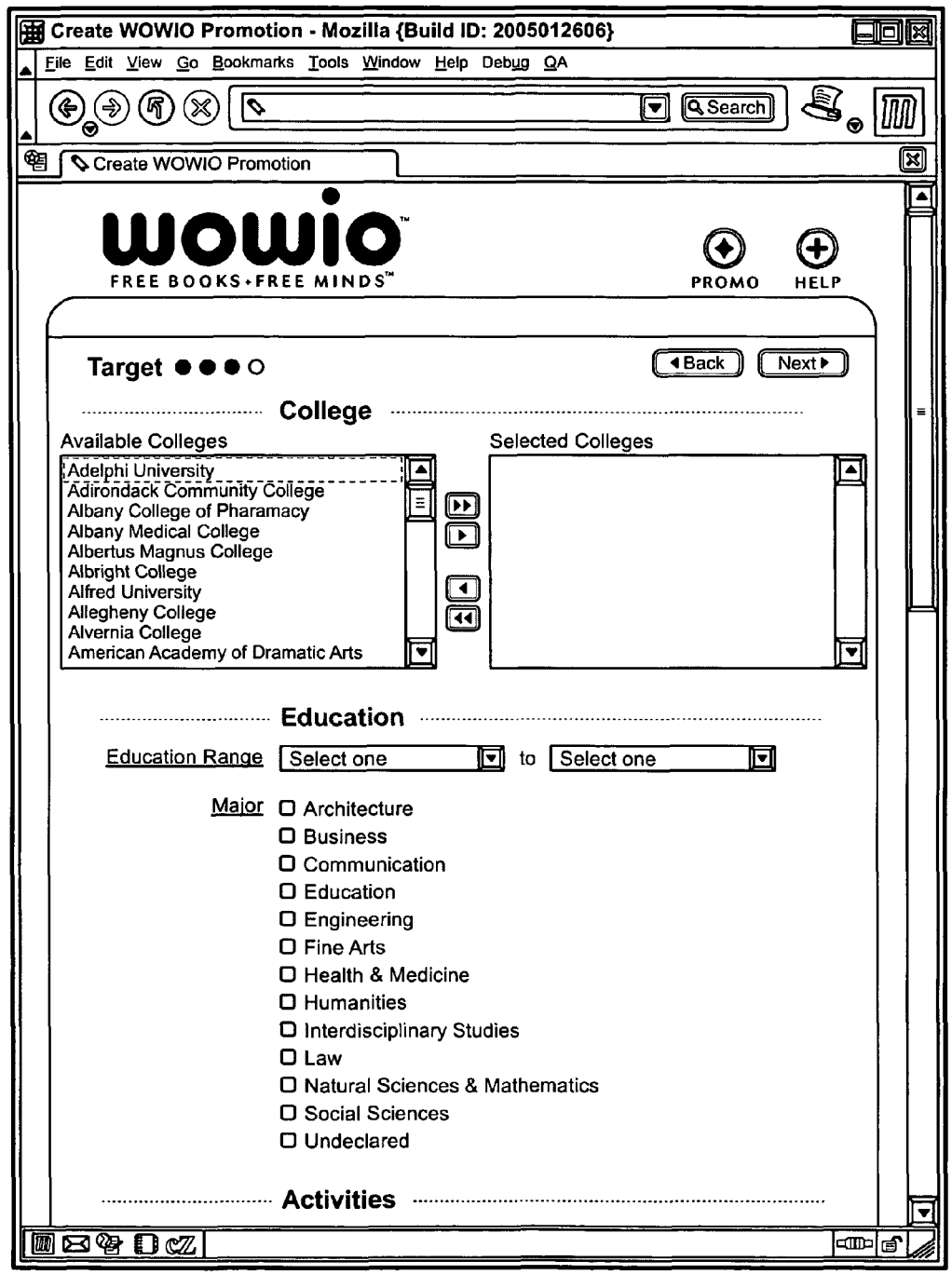

FIG. 29 shows, in accordance with at least one embodiment of the present disclosure, a webpage showing yet additional subscriber target criteria requested when creating a promotion, incentive or prize for subscribers reading the electronic books.

Figure 30:
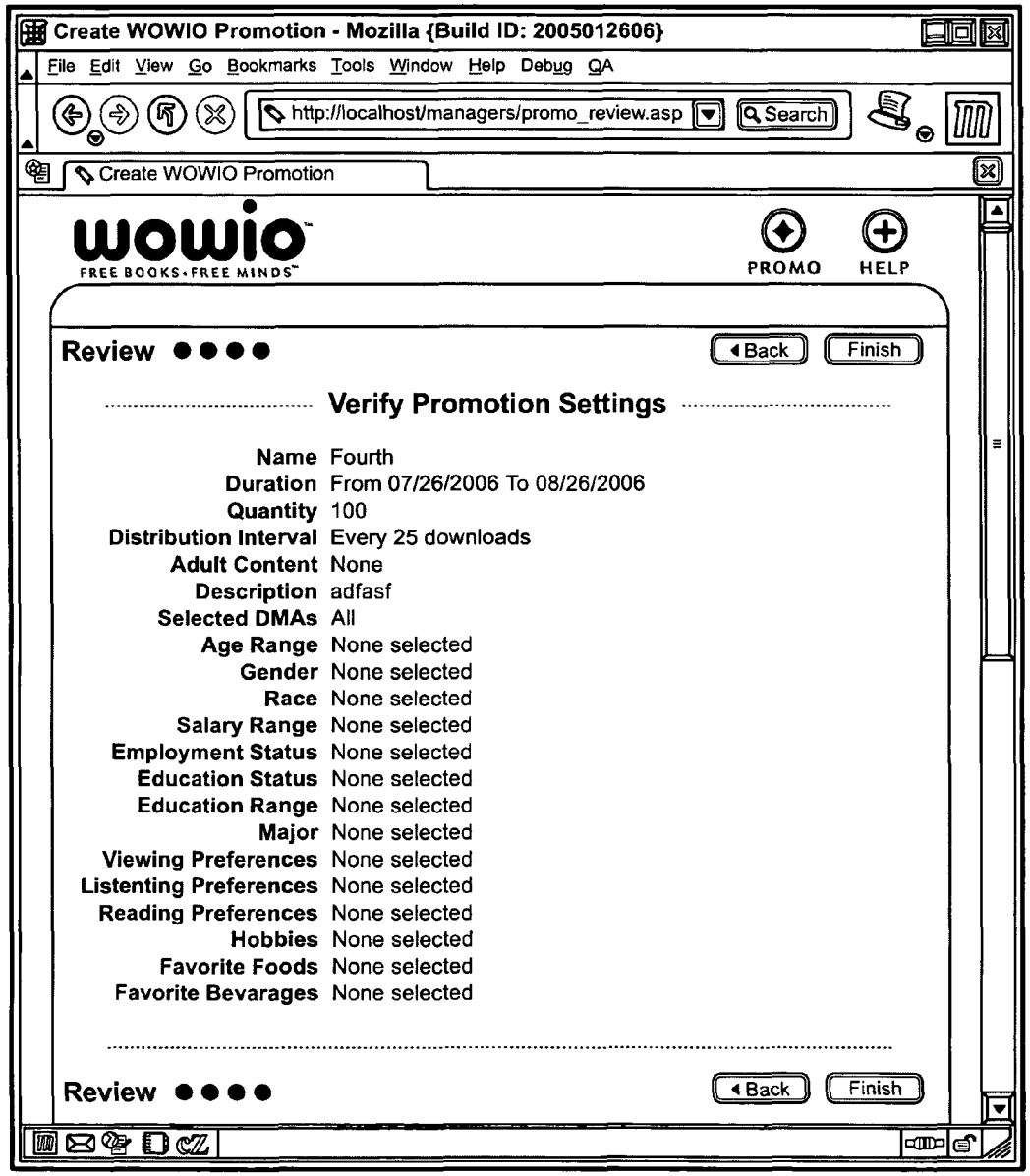

FIG. 30 shows, in accordance with at least one embodiment of the present disclosure, a webpage where the promotion, incentive or prize setting provided can be reviewed and verified.

Figure 31:
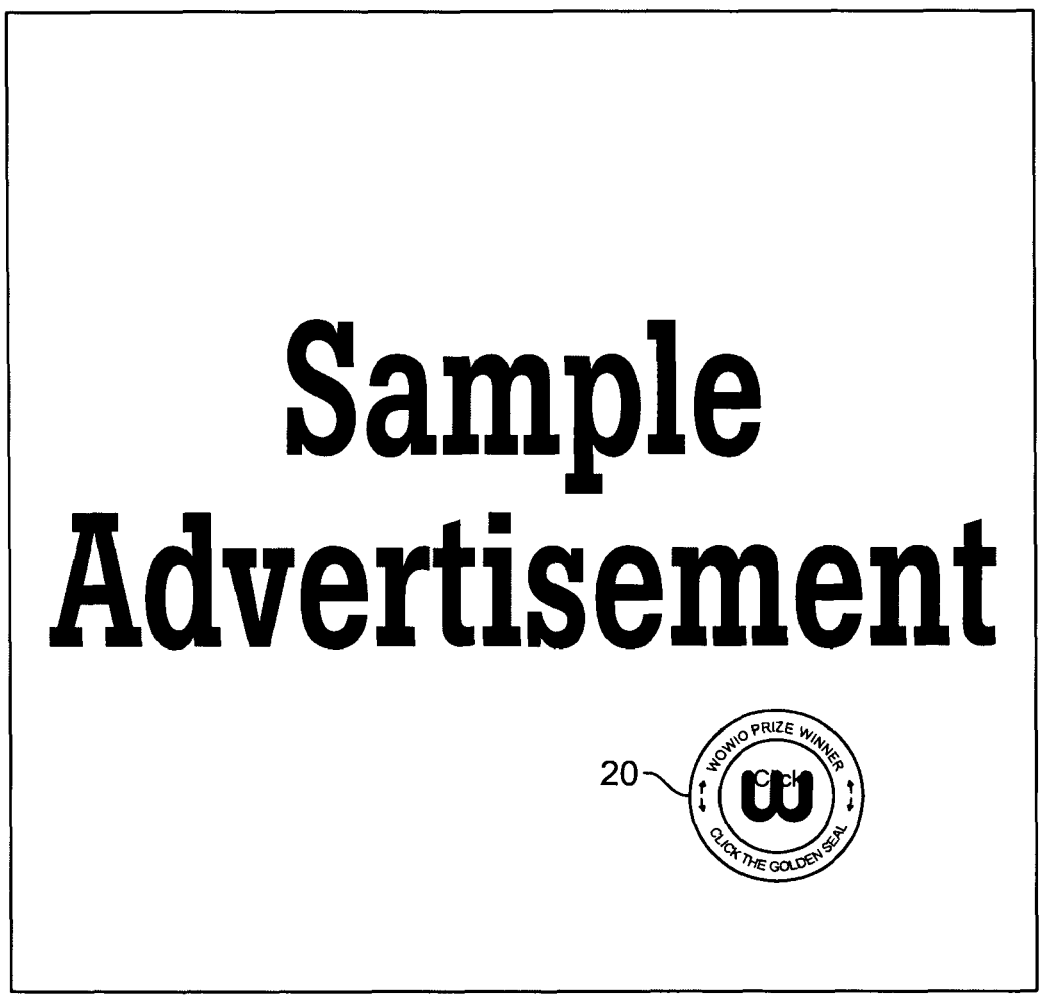

FIG. 31 shows, in accordance with at least one embodiment of the present disclosure, a blank sample advertising page containing an emblem or symbol indicating to the subscriber reviewing the advertising that he or she is the winner of a promotion, incentive, or prize.

Figure 32:
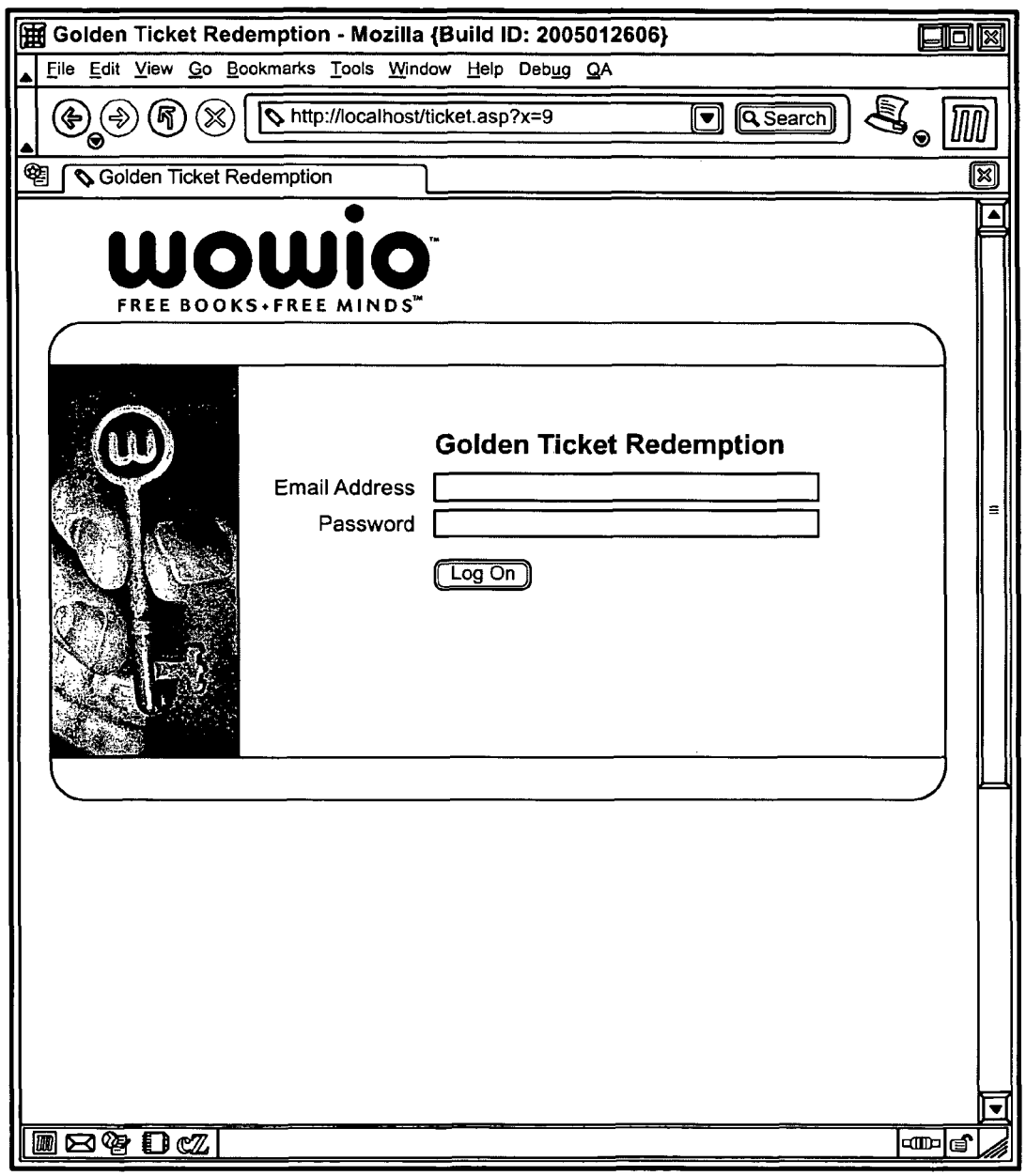

FIG. 32 shows, in accordance with at least one embodiment of the present disclosure, a webpage where subscribers can redeem a promotion, incentive, or prize awarded to them.

Figure 33:
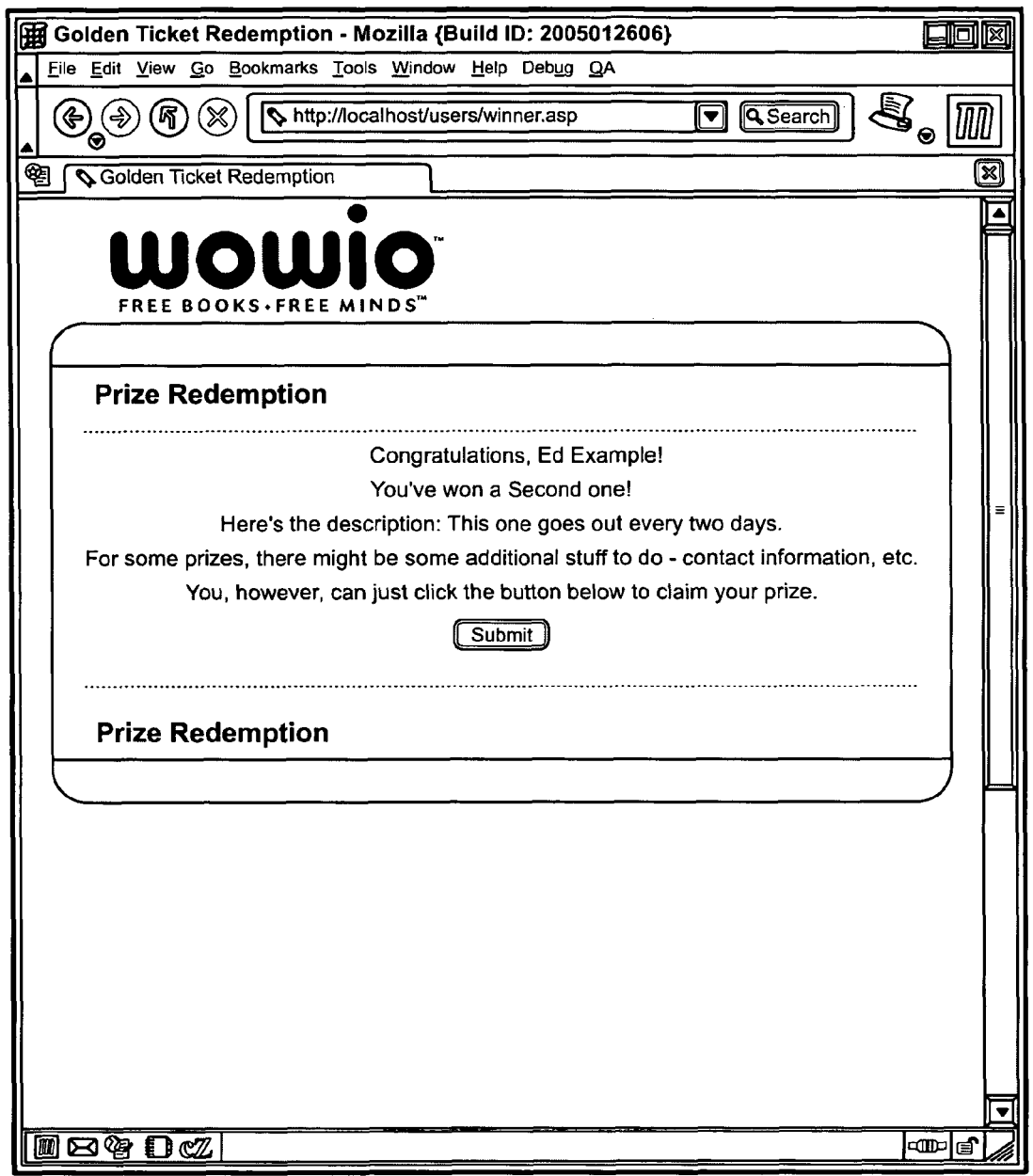

FIG. 33 shows, in accordance with at least one embodiment of the present disclosure, a webpage where subscribers who have received a promotion, incentive, or prize can receive additional information regarding it and, if necessary, provide additional information or take additional steps to receive it.

Figure 34:
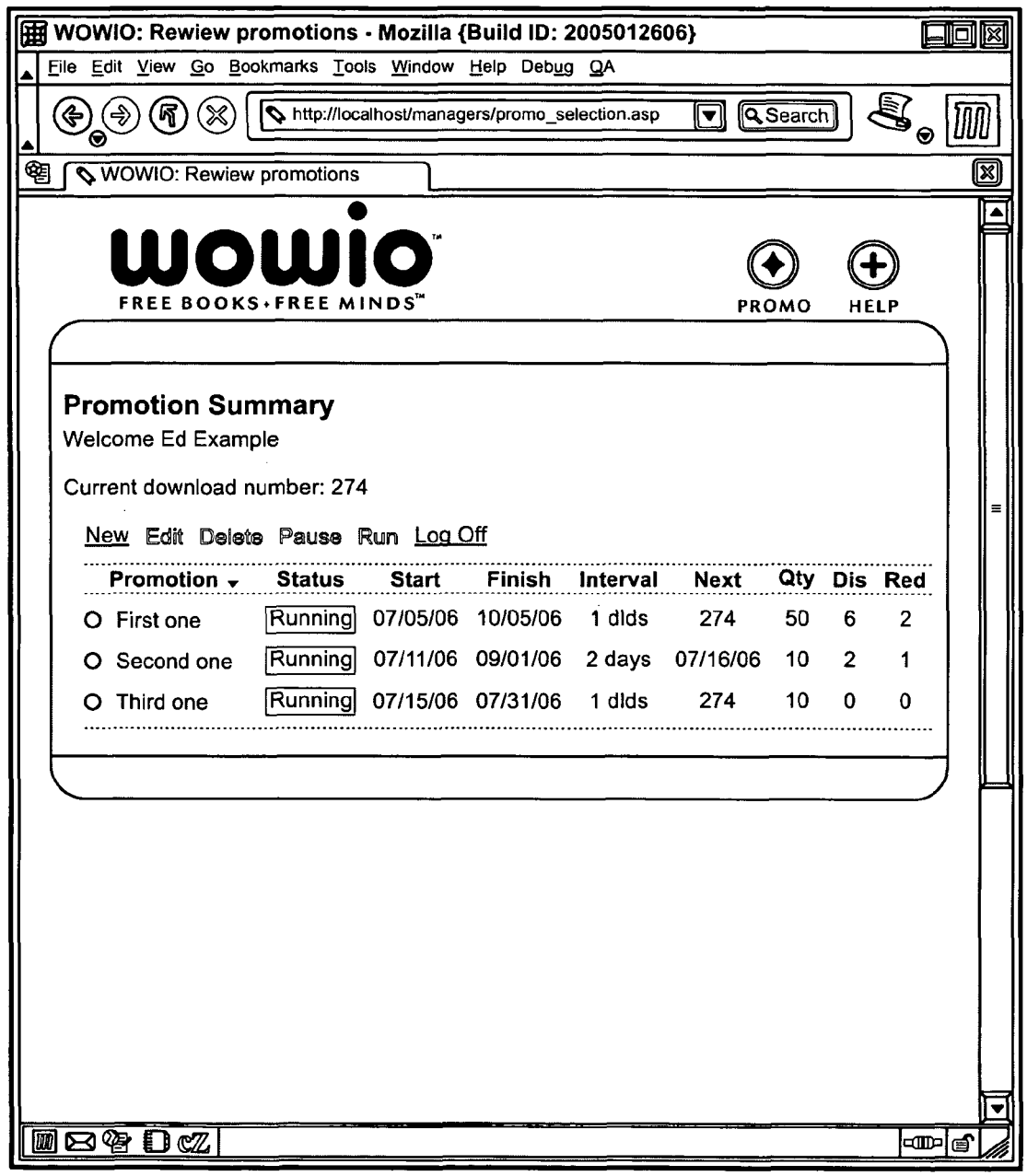

FIG. 34 shows, in accordance with at least one embodiment of the present disclosure, a webpage where important aspects, information and statistics regarding an incentive, promotion, or prize can be viewed or modified in accordance with at least one embodiment of the present disclosure.

DETAILED DESCRIPTION

The present disclosure is directed to a method and apparatus for providing individuals with electronic books containing specifically targeted advertising and preventing electronic advertising fraud, which provides numerous benefits and advantages over prior art methods, some of which have been mentioned above. The method can be a computer implemented method where individuals interested in receiving electronic books can become subscribers and receive or have access to electronic books at significant discount or for free. For students, individuals on a tight budget, and those individuals that simply want to save money, the ability to view or download electronic books, including textbooks, for free or at a significant discount is very appealing.

In one exemplary embodiment of the present disclosure, a method for providing individuals with a plurality of electronic books (a.k.a. e-books) containing targeted electronic advertising that prevents or greatly reduces various types of advertising fraud is provided.

Figure 1:
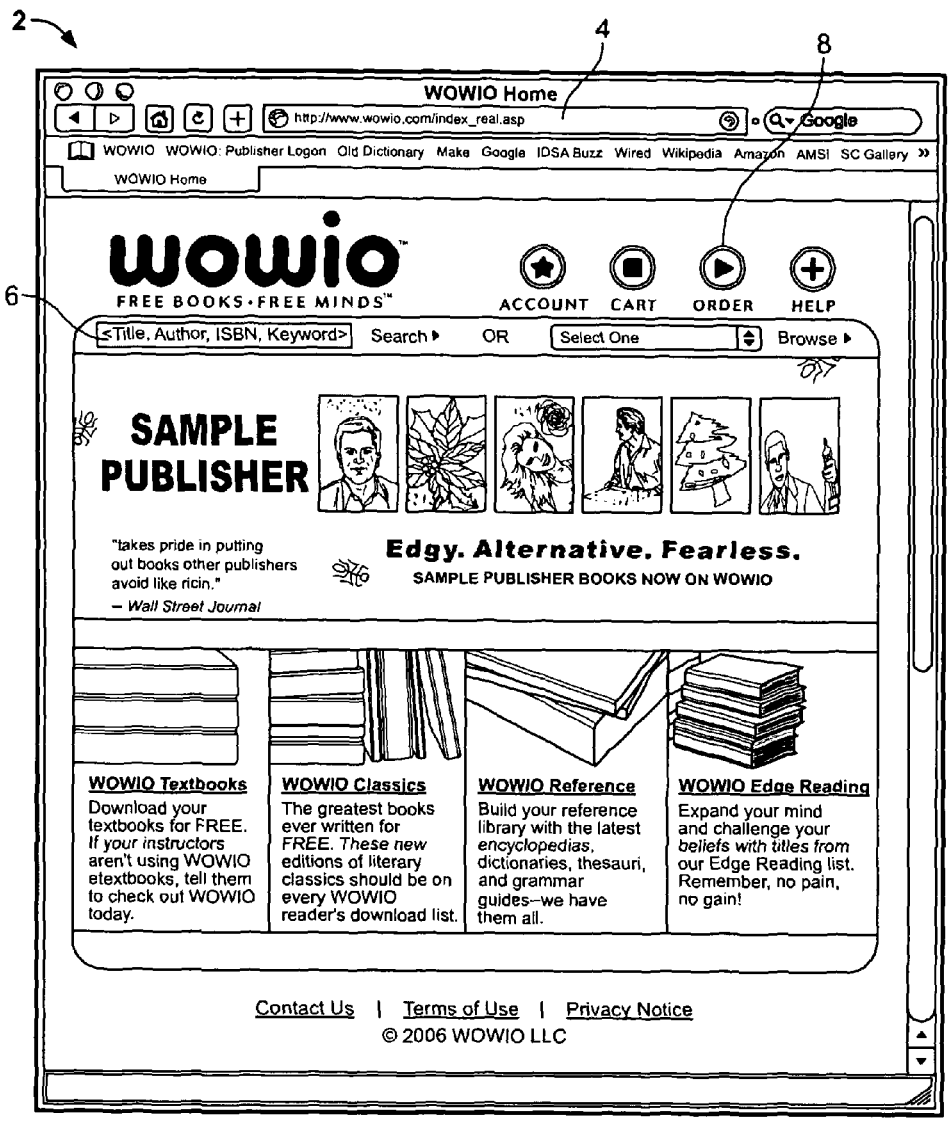
FIG. 1 shows, in accordance with at least one embodiment of the present disclosure, a webpage where individuals interested in becoming subscribers and downloading electronic books are introduced to various features, benefits and advantages of the present disclosure.

As shown in FIG. 1, in accordance with one aspect of the present disclosure, an individual interested in receiving electronic books can use a computer or other electronic device (e.g., PDA or cell phone) connected to the Internet to interact with a particular webpage 2. For example, the webpage 4 could be located at world wide web address hhtp://www.wowio.com or http://www.wowio.com/index_real.asp. The webpage can be viewed using any known means of viewing a webpage including using what is commonly refereed to as a web browser (e.g., Internet Explorer or Netscape).

The individual can browse the information on the webpage and the pages that it links to, to familiarize him or herself with various aspects of the website and how he or she can receive or have access to electronic books containing specifically targeted advertising for free or at a substantial discount. The individual can get an idea of the types of books and sample publishers available through the website and perform a variety of functions associated with creating or managing an account and receiving electronic books. For example, the individual can search for specific electronic books by entering a variety of information (e.g., title, author, ISBN or keyword) into a search field 6 or can select or browse books belonging to a certain category or type of books.

Figure 2:
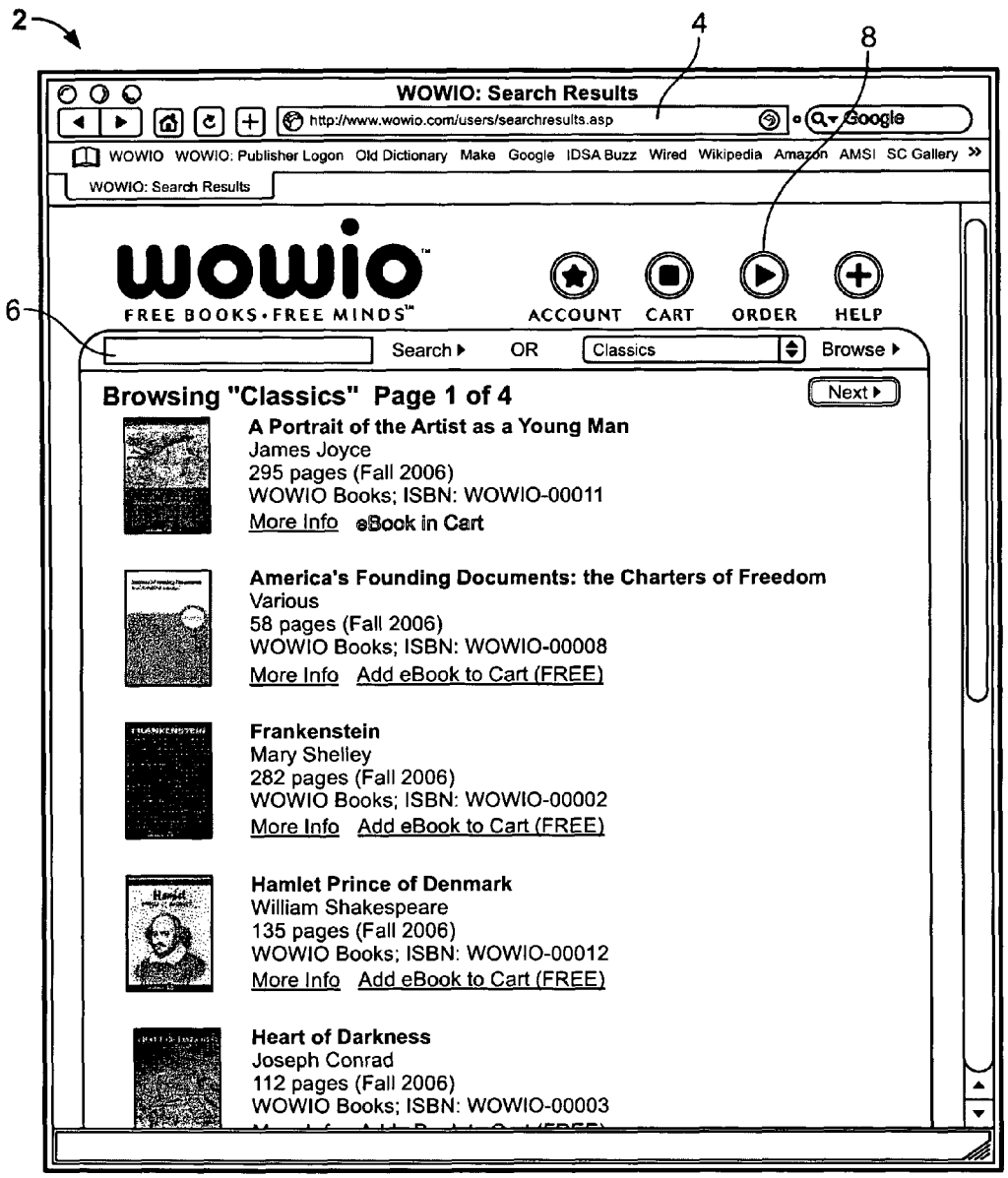

FIG. 2 shows, in accordance with one aspect of the present disclosure, that the individual can, for example, browse the electronic books identified as "classics" and obtain additional information regarding each electronic book offered and its cost, if any. Once the individual finds an electronic book that he or she would like to have access to, he or she can select the electronic book. Once one or more electronic books are selected, the individual can order the selected electronic books by, for example, clicking "order" button 8.

In one aspect of the present disclosure, the individual then views another webpage, an example of which is shown in FIG. 3, where an individual who is already a subscriber can logon using their previously determined login information (e.g., username or email address and password) or retrieve their password information. An individual who is not a subscriber (e.g., new user) can start the process of becoming a subscriber. By selecting the "I am a new user" link 10, the individual will begin the process of becoming a subscriber.

FIG. 4 shows, in accordance with one aspect of the present disclosure, a webpage informing individuals of the process of becoming a subscriber. As FIG. 4 demonstrates, in aspect of the present disclosure, the process of becoming a subscriber requires the individual prove his or her identity, tell us about him or herself, and agree to certain terms and conditions of using the products and services of the website. It should be appreciated that it is within the scope of the present disclosure to vary the requirements of becoming a subscriber. For example, becoming a subscriber may only require that the individual desiring to download or have access to electronic books provide information about him or herself. It should also be appreciated that the scope of the present disclosure includes modifying the requirements to become a subscriber to meet the needs of author(s), publisher(s), distributor(s) or provider(s) of the electronic book or the owner(s) of the intellectual property associated with the electronic book.

As FIG. 5 shows, in accordance with one aspect of the present disclosure, the process of becoming a subscriber requires that the individual provide information that identifies them (e.g., name and address) and verifies their identity using their credit card info. By obtaining this information, the electronic book provider can account for who is using its products and services. Additionally, verifying an individual's identity allows the electronic book provider to hold the subscriber accountable for their actions and, if the subscriber acts in a way that the electronic book provider finds undesirable or improper (e.g., causing the unwanted to illegal dissemination or copying of an electronic book they received or had access to), the electronic book provider can cancel or modify their subscriber status and, if necessary, prevent the individual from becoming a subscriber again. Additionally, the verification can be used to prevent individuals that the electronic book provider does not want using its products and services (e.g., minors) from providing false information and obtaining access to electronic books.

In one aspect of the present invention, the subscriber can also provide a referral code or a friends and family code that provides the subscriber, his or her friends and family, or the person who referred him or her various benefits. In one aspect of the present invention, the friends and family code allows others to use the subscribers account to obtain electronic books without having to become subscriber.

As FIGS. 6, 7A, and 7B show, in accordance with one aspect of the present disclosure, an individual provides a variety of information about him or herself that will be matched with the subscriber target criteria. It should be appreciated that the information obtained from the individual could be any information that would be of interest to an advertiser, author, owner of the intellectual property associated with the electronic book, content provider or provider of the electronic book or their affiliates. Examples of information that might be requested include but are not limited to the individual's name, address, email address, age, gender, billing information (e.g., credit card or banking information), race, educational status, educational history, employment status, employment history, past or present employment duties, activities, viewing preferences, listening preferences, reading preferences, hobbies, food preferences, beverage preferences, email preferences, and agreement to or acceptance of one ore more licensing agreements regarding their use of the electronic book provider's products and services.

FIG. 8 shows, in accordance with one aspect of the present disclosure, that in at least one embodiment of the present invention, the process of becoming a subscriber includes agreeing to or accepting a licensing agreement. In another aspect of one embodiment of the present disclosure, the individual also provides information regarding his or her preferences to receive email from the electronic book provider, its associates or affiliates.

FIG. 9 shows, in accordance with one aspect of the present disclosure, a webpage indicating to the individual that they have completed the process of setting up an account are now a subscriber that can download electronic books.

FIG. 10 shows, in accordance with one aspect of the present disclosure, a webpage where the subscriber can view the electronic book or books he or she has selected to order and submit his or her order for them. In one aspect of the present disclosure, when the order for the electronic book is ready, the subscriber requesting the electronic book will receive an email indicating that it is available for download or able to be accessed.

FIG. 11 shows, in accordance with one aspect of the present disclosure, a webpage indicating to the subscriber that their order for one or more electronic books has been received and is being processed.

FIG. 12 shows a sample email sent in accordance with at least one aspect of the disclosure indicating to the subscriber that requested the electronic book that his or her book is ready. In yet another aspect of the present disclosure, the email would contain a code, link or other identifying item that would allow the electronic book provider to confirm that the subscriber has provided a correct email address and prevent him or her from being able to download electronic books if he or she did not provider the correct email address.

FIG. 13 shows, in accordance with one aspect of the present disclosure, a webpage where subscribers can view and modify various aspects of their account, including but not limited to, viewing their orders, updating their profile or setting up friends and family to use their account.

FIG. 14 shows, in accordance with one aspect of the present disclosure, a webpage where the subscriber can download the electronic book containing advertisements. The scope of the present disclosure includes the subscriber downloading, obtaining or viewing the electronic book using any known means, including being granted access to it or its contents or viewing it using an electronic book viewer.

FIG. 15 shows, in accordance with one aspect of the present disclosure, a sample electronic book as viewed using an electronic document viewer (e.g., Acrobat Reader). The electronic book contains the contents of the traditional paper bound book, a set of book marks that can be used to quickly navigate various parts of the electronic book including the covers, chapters, and the advertiser's index. In accordance with one aspect of the present disclosure, the electronic book includes the name of the subscriber, in this case Joe Ejemplo shown as 12, as part of the electronic books. By providing the subscriber's name on the electronic book, when the subscriber knows his or her name has been verified by the electronic book provider, the subscriber is going to be less likely to reproduce or distribute the electronic book illegally and is more likely to follow the guidelines and rules set out by the electronic book provider.

FIG. 16 shows, in accordance with one aspect of the present disclosure, a sample advertisement inserted into the electronic book. The advertisement is associated with subscriber target criteria identified by the advertiser and inserted into the electronic book if the subscriber's information satisfies the subscriber target criteria associated with the advertisement. In another aspect of the present disclosure, the advertisement is inserted into the electronic book based on how closely its subscriber target criteria is satisfied by information from the subscriber. In another aspect of the present disclosure, the subscriber target criteria is satisfied when a certain percentage or amount of the subscriber target criteria matches the information from the subscriber.

FIG. 17 shows, in accordance with one aspect of the present disclosure, another page of the electronic book. In accordance with one aspect of the present invention, the electronic book contains a code 14 that can identify information about the electronic book and the subscriber that requested it. It should be appreciated that the scope of the present disclosure includes the electronic book containing one or more bar codes, images or other identifying information that may or may not be visible to the subscriber that can be used to reveal the identity of the subscriber or other important information about the creation or dissemination of the electronic book.

FIG. 18 shows another page from the electronic book having, as part of the PDF image of the book, containing the same pagination 16 as a print copy of the book.

FIG. 19 shows, in accordance with one aspect of the present disclosure, an advertiser's index page at the end of the electronic book listing all the advertisers in the electronic book and providing the subscriber with an easy way to find specific advertisements.

FIG. 20 shows, in accordance with one aspect of the present disclosure, a webpage where advertisers who want to pay to advertise in one or more of the electronic books can login.

FIG. 21 shows, in accordance with one aspect of the present disclosure, a webpage where advertisers can monitor and view important information about their various ad campaigns, including their status, start time, finish, budget, completion rate or percent, number of impressions and clicks.

FIGS. 22, 23, and 24A and 24B show, in accordance with one aspect of the present disclosure, the information an advertiser would provide to set up and run an advertising campaign. It should be appreciated that the scope of the present disclosure includes the various advertisers providing different types and amounts of information based on their own particular needs and desires. Additionally, to prevent advertising fraud, in accordance with one aspect of the present disclosure, advertisers can select the maximum impressions of an advertisement associated with a campaign per user by modifying the information shown in box 16 of FIG. 22. Similarly, advertisers can select the maximum number of clicks on an advertisement placed in an electronic book by modifying the information shown in the box 18 of FIG. 22. In doing so, the method and apparatus of the present invention prevents or greatly reduces click and impression fraud.

To make the advertisements provided in the electronic books even more effective, one aspect of the present disclosure allows promotions to be set up so that notification can be added to certain advertisements indicating that the subscriber has won an incentive (e.g., prize). FIGS. 25, 26, 27, 28A, 28B, 29, and 30 show, in accordance with one aspect of the present disclosure, web pages for setting up a promotion by the electronic book provider, an advertiser or a third party. The promotion provides the benefit of encouraging or enticing subscribers to view and consider the advertisements, which often are highly relevant to the subscriber's interests and adds content value to the electronic book, even if for no other reason that to win an incentive.

FIG. 31 shows an example of a notification, which in one embodiment is called a golden ticket, on an advertisement that would indicate to subscribers that they have received or are eligible to receive an incentive.

FIG. 32 shows, in accordance with one aspect of the present disclosure, a webpage where subscribers can login to retrieve their incentive.

FIG. 33 shows, in accordance with one aspect of the present disclosure, a webpage where the subscriber is notified that he or she has won a prize and might have to provide some additional information (e.g., verify that the information they provided was correct) or perform certain acts to receive their prize. It should be appreciated that providing incentives, which might require you to verify certain information the subscriber provided, provides the benefit of causing subscribers to want to give true and accurate information about themselves so that they are can receive a prize if they are fortunate enough to be awarded one. This also provides advertisers with the additional benefit that they have additional guarantees and confidence that subscribers have provided full and accurate information and that their advertising is in fact being specifically targeted to only those individuals that they want to target.

FIG. 34 shows, in accordance with one aspect of the present disclosure, a webpage where the subscriber can view important information regarding the promotions that they have won.

It should be appreciated that an additional advantage of the method and apparatus of the present invention is that it allows content providers and others wanting to take advantage of the benefits of advertising to do so without appearing influenced by advertisers. Because the method and apparatus of present invention allows advertising to be inserted into an electronic book without the content provider being involved or even knowing which advertisements are going to be placed in any of the electronic books, the content provider enjoys the benefit of being not being associated with the advertiser and remaining unbiased to subscribers.

In one exemplary embodiment, the method includes receiving or having access to at least the contents of two or more books. It should be appreciated that the more books the electronic book provider receives, the more books it will have as part of its collection that it can offer to individuals requesting electronic books. Accordingly, in one aspect of the disclosure, the contents of hundreds if not thousands of electronic books are received or given access to allowing individuals who want electronic books to find the exact book or books they desire. The content can be provided by any well known means, including but not limited to, providing or giving access to an electronic version of the book in any known electronic format (e.g., a PDF, XML, XSL or Word file) or providing a physical copy of the book. The content can be provided by any individual or entity that has rights to the content of the book, including but not limited to, publishers, content providers, authors and distributors of the book or its contents.

The method also includes the electronic book provider receiving or having access to subscriber target criteria for one or more advertisements. The subscriber target criteria can be any set of criteria that the advertiser wants to identify and associate with its advertising.

The method also includes receiving, creating or having access to one or more advertisements that are associated with the one or more subscriber target criteria. These advertisements, once they are selected because the subscriber's information matched (or somewhat matched) the subscriber target criteria associated with the advertising, are inserted in the electronic book.

The method also includes receiving or having access to information from a first subscriber interested in receiving one or more electronic books. As discussed above, this information is used to match the subscriber with the most relevant targeted advertising that will increase the content value of the electronic book.

The method also includes receiving or having access to a first request from the first subscriber for a first electronic book. The request can be received or given access to by any means known, now or in the future, including but not limited to sending an email, activating a hyperlink or clicking on the appropriate icon in a webpage.

The method also includes determining or having access to whether the subscriber target criteria for the advertisements is satisfied by the information from the subscriber that requested an electronic book and selecting a set of advertisements for the electronic book by choosing at least one of the advertisements having associated subscriber target criteria that is satisfied by the information from the subscriber requesting the electronic book.

The method also includes inserting or having inserted the selected set of advertisements for the electronic book into the electronic book and providing or providing access to the electronic book to the subscriber who requested it. It should be appreciated that the method of the present apparatus includes repeating these steps with the same or different subscribers numerous times to provide an unlimited amount of additional electronic books.

It should be appreciated that accounting records are maintained for each advertiser and content provider to ensure that advertisers are properly charged and content providers are paid accordingly. In one aspect of the present disclosure, when an electronic textbook is delivered to or accessed by a subscriber, the records for the content provider of the electronic book, and for each advertiser associated with an advertisement in the electronic book, are updated. Revenue is collected from the advertisers, and the content provider is compensated based on the number of subscribers to which the electronic textbook is sent.

These implementations can be governed by individual inter-party agreements, or by a single blanket agreement. Compensation can take any form, including cash, credits, scrip and the like.

It should be appreciated that the electronic book of the present disclosure can be delivered and accessed by several known methods, including e-mail or a simple download from the web page.

Preferably, the format of the electronic textbook is portable document format (PDF). A PDF document can be viewed and manipulated on a variety of different platforms and can be presented in a predetermined format where the appearance of the document as viewed by a reader is as it was intended by the content provider. PDF was developed by Adobe Systems, Incorporated of San Jose, Calif. An Acrobat program on one platform can create, display, edit, print, annotate, etc., a PDF document produced by another Acrobat program running on a different platform, regardless of the type of computer platform used. A document in a certain format or language can be translated into a PDF document using Acrobat. A PDF document can be quickly displayed on any computer platform having the appearance intended by the publisher, allowing the publisher to control the final appearance of the document.

One application for portable electronic documents is the retrieval of such documents from the Internet. Users may download data from Internet network sites and display the data that includes information presented as text in various fonts, graphics, images, and the like having an appearance intended by the publisher. A file format such as PDF that allows any platform to view a document having an appearance as intended by a publisher is thus of great value when downloading files from such widely-accessible and platform-independent network sources such as the Internet.

Alternatively, the electronic textbook format can be extensible markup language (XML) with extensible style sheet language (XSL). In other implementations, any structured markup language can be used. An additional format that can be used for the electronic textbook is the open e-book publication structure (OEBPS) format, which has been adopted by Microsoft. The format can be found at http://www.idpf.org.

The electronic textbook is received by the distributor with no space reserved for ads. The distributor makes space in the electronic textbook to insert ads, for example, by adding pages of text in a PDF file or XML/XSL file.

Subscriber target criteria are supplied by the advertiser and are associated with the electronic advertisement. The level of similarity between the subscriber target criteria and the information from the subscriber is determined. In one exemplary embodiment, each advertisement receives a score based on the quality of its match with the subscriber target criteria. The advertising is then selected based on the scores the advertisements received.

Many processes and methods can be used to determine the location for insertion within the electronic textbook of a particular ad or set of advertisements. For example, advertisements can be located randomly throughout the electronic textbook. Conversely, advertisements can be spaced evenly throughout the electronic textbook according to the number of advertisements to be inserted. Advertisements can also be clustered in one area of the book, such as the start, end, or center.

In one implementation, the cost of placing the advertisement in the electronic book is fixed. In another implementation, the cost is determined by the location of the ad within the electronic textbook. For example, more valuable locations may be located near the front or end of the book, or near chapter headings and the like. In another implementation, the cost for an advertisement is determined by a bid offered by the advertiser to place the advertisement within the electronic textbook.

The disclosure can be implemented in digital electronic circuitry, or in computer hardware, firmware, software, or in combinations of them. Apparatus of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output.

To provide for interaction with a user, the disclosure can be implemented on a computer system or mobile media device having a display device such as a monitor or LCD screen for displaying information to the user, and an input device through which the user can provide input to the system or device. For example, a computer commonly uses input devices such as a keyboard and mouse, and mobile playing devices commonly use input devices such as trackpad and buttons.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A method for providing individuals with a plurality of electronic books containing targeted advertising comprising:
   a. receiving on a computer the contents of two or more books;
   b. receiving one or more subscriber target criteria for one or more advertisements;
   c. receiving, or creating one or more advertisements that are associated with the one or more subscriber target criteria;
   d. receiving on a computer information from a first subscriber interested in receiving one or more electronic books;
   e. receiving on a computer a first request from the first subscriber for a first electronic book;
   f. determining if the information from the first subscriber requesting the electronic book satisfies the one or more subscriber target criteria for the one or more advertisements;
   g. selecting a first set of advertisements for the first electronic book by choosing at least one of the one or more advertisements having one or more associated subscriber target criteria that are satisfied by the information from the first subscriber requesting the first electronic book;
   h. inserting the selected first set of advertisements for the first electronic book into the first electronic book;
   i. providing the first electronic book to the first subscriber making a first request for a first electronic book for free;
   j. selecting the first set of advertisements for the first electronic book further requiring choosing at least one of the one or more advertisements having one or more associated subscriber target criteria that are satisfied by the information from the first subscriber requesting the first electronic book; and
   k. selecting a first set of advertisements for the first electronic book and inserting the selected first set of advertisements for the first electronic book into the first electronic book are performed in such a way that the first electronic book provided does not contain the same advertising in the same location of the electronic book as any other electronic book previously provided to a subscriber thereby identifying a unique first electronic book.

2. A method of claim 1, wherein choosing at least one of the one or more advertisements having one or more associated subscriber target criteria that are satisfied by the information from the first subscriber requesting the first electronic book is done randomly.

3. A method of claim 1, wherein the first set of selected advertising and their relative locations in the first electronic book can be used to identify which subscriber or subscribers were provided the first electronic book.

4. A method of claim 1, wherein the information from the first subscriber making a first request on a computer for electronic books includes one or more of the following:
   i. the subscriber's name and address;
   ii. the subscriber's email address;
   iii. the subscriber's age and gender;
   iv. credit card information for the subscriber;
   v. information that can be used to verify the identity of the subscriber;
   vi. the subscriber's race;
   vii. the subscriber's educational status;
   viii. the subscriber's educational history;
   ix. the subscriber's employment status;
   x. the subscriber's employment history;
   xi. the subscriber's past and present employment duties;
   xii. the subscriber's activities;
   xiii. the subscriber's viewing preferences;
   xiv. the subscriber's listening preferences;
   xv. the subscriber's reading preferences;
   xvi. the subscriber's hobbies;
   xvii. the subscriber's food preferences;
   xviii. the subscriber's beverage preferences;
   xix. the subscriber's email preferences; and
   xx. the subscriber's agreement to or acceptance of a licensing agreement regarding the electronic books.

5. A method of claim 1, wherein the contents of the two or more books are from textbooks and the electronic books are electronic textbooks.

6. A method of claim 1, wherein the information from a first subscriber interested in receiving one or more electronic books includes at least the subscriber's name, address, email address, age and gender.

7. A method of claim 1, wherein at least one of the advertisements in the electronic book provided contains a notification that the subscriber who requested the first electronic book has won an incentive.

8. A method of claim 7, wherein, in order for the subscriber to receive the incentive, the subscriber must provide or verify certain information or perform certain acts.

9. A method of claim 1, wherein the first electronic book contains the name of the first subscriber who requested the electronic book.

10. A method of claim 1, wherein the first electronic book contains one or more unique serial numbers, bar codes, images or other identifying information that may or may not be visible to the first subscriber that can be used to identify the first subscriber.

11. A method of claim 1 further comprising:
j. receiving on a computer or a computer containing information from a second subscriber interested in receiving one or more electronic books;
k. receiving on a computer a first request from the second subscriber for a second electronic book;
l. determining if the information from the second subscriber requesting the electronic book satisfies the one or more subscriber target criteria for the one or more advertisements;
m. selecting a second set of advertisements for the second electronic book by choosing at least one of the one or more advertisements having one or more associated subscriber target criteria that are satisfied by the information from the second subscriber requesting the second electronic book;
n. inserting the selected second set of advertisements for the second electronic book into the second electronic book; and
o. providing for free the second electronic book to the subscriber making a first request for a second electronic book.

12. The method of claim 11, wherein selecting the first and second set of advertisements for the first and second electronic books further requires choosing at least one of the one or more advertisements having one or more associated subscriber target criteria that are satisfied by the information from the first and second subscribers requesting the first and second electronic books respectively.

13. A method of claim 11, wherein selecting a first set of advertisements for the first electronic book and inserting the selected first set of advertisements for the first electronic book into the first electronic book are performed in such a way that the first electronic book provided does not contain the same advertising in the same location of the electronic book as any other electronic book previously provided to a subscriber and selecting a second set of advertisements for the second electronic book and inserting the selected second set of advertisements for the second electronic book into the second electronic book are performed in such a way that the second electronic book provided does not contain the same advertising in the same location of the electronic book as any other electronic book previously provided to a subscriber.

14. A method of claim 11, wherein the first set of selected advertising and their relative locations in the first electronic book and the second set of selected advertising and their relative locations in the second electronic book can be used to identify which subscribers were provided the first and second electronic books.

15. A method of claim 11, wherein the information from the first and second subscribers making a first request on a computer for the first and second electronic books respectively includes one or more of the following:
i. the subscriber's name and address;
ii. the subscriber's email address;
iii. the subscriber's age and gender;
iv. credit card information for the subscriber;
v. information that can be used to verify the identity of the subscriber;
vi. the subscriber's race;
vii. the subscriber's educational status;
viii. the subscriber's educational history;
ix. the subscriber's employment status;
x. the subscriber's employment history;
xi. the subscriber's past and present employment duties;
xii. the subscriber's activities;
xiii. the subscriber's viewing preferences;
xiv. the subscriber's listening preferences;
xv. the subscriber's reading preferences;
xvi. the subscriber's hobbies;
xvii. the subscriber's food preferences;
xviii. the subscriber's beverage preferences;
xix. the subscriber's email preferences; and
xx. the subscriber's agreement to or acceptance of a licensing agreement regarding the electronic books.

16. A method of claim 11 wherein the contents of the two or more books are from textbooks and the first and second electronic books are electronic textbooks.

17. A method of claim 11, wherein the information from a first and second subscriber requesting the first and second electronic books respectively includes at least the first and second subscribers' names, addresses, email addresses, ages and genders.

18. A method of claim 11, wherein at least one of the advertisements in the first electronic book, the second electronic book or the first and second electronic books provided contains a notification that the subscriber or subscribers who requested the electronic books have won an incentive.

19. A method of claim 11, wherein in order for the subscriber or subscribers to receive the incentive requires that the subscriber or subscribers provide or verify certain information or perform certain acts.

20. A method of claim 11, wherein the first electronic book contains the name of the first subscriber who requested the electronic book and the second electronic book contains the name of the second subscriber who requested the electronic book.

21. A method of claim 11, wherein the first and second electronic books each contain one or more unique serial numbers, bar codes, images or other identifying information that may or may not be visible to the first or second subscriber that can be used to reveal the identity of the first and second subscriber or other important information about the creation or dissemination of the first and second electronic book.

22. A method of claim 11, wherein the selected first and second set of selected advertisements contain one or more additional advertisements that cannot be viewed by the first or second subscriber respectively until a predefined event occurs and the first and second set of selected advertisements have the ability to display or link to a additional or related information about the advertisement.

23. An apparatus for providing one or more subscribers with a plurality of electronic books containing specifically targeted advertising comprising:
one or more computers or electronic storage devices containing the contents of two or more books, subscriber target criteria for one or more associated advertisements to be placed in one or more electronic books, information from one or more subscribers interested in receiving one or more electronic books, and advertising information from one or more advertisers;
wherein upon receiving a request for an electronic book from the one or more subscribers, the one or more computers or electronic storage devices determine or obtain information regarding which of the subscribers' target criteria for one or more associated advertisements are satisfied by the information from the one or more subscribers that requested the electronic book and select and insert or have inserted the one or more associated advertisements having satisfied subscriber target criteria into an electronic book and providing the requested electronic book containing the associated advertising to the one or more subscribers that requested the electronic book for free;

wherein the apparatus selects the one or more associated advertisements for the electronic book by choosing at least one of the one or more associated advertisements having one or more subscribers' target criteria that is satisfied by the information from the one or more subscribers and the apparatus inserts the one or more associated advertisements for the electronic book into the electronic book in such a way that each electronic book provided does not contain the same advertising in the same location of the electronic book as any other electronic book previously provided to a subscriber thereby identifying a unique electronic book.

24. An apparatus of claim 23, wherein information from one or more subscribers interested in receiving one or more electronic books contained on the one or more computers or electronic storage devices includes one or more of the following:
   i. the subscriber's name and address;
   ii. the subscriber's email address;
   iii. the subscriber's age and gender;
   iv. credit card information for the subscriber;
   v. information that can be used to verify the identity of the subscriber;
   vi. the subscriber's race;
   vii. the subscriber's educational status;
   viii. the subscriber's educational history;
   ix. the subscriber's employment status;
   x. the subscriber's employment history;
   xi. the subscriber's past and present employment duties;
   xii. the subscriber's activities;
   xiii. the subscriber's viewing preferences;
   xiv. the subscriber's listening preferences;
   xv. the subscriber's reading preferences;
   xvi. the subscriber's hobbies;
   xvii. the subscriber's food preferences;
   xviii. the subscriber's beverage preferences;
   xix. the subscriber's email preferences; and
   xx. the subscriber's agreement to or acceptance of a licensing agreement regarding the electronic books.

25. An apparatus of claim 24, wherein the contents of the two or more books are from textbooks and the electronic books are electronic textbooks.

26. An apparatus of claim 24, wherein the first electronic book contains one or more unique serial numbers, bar codes, images or other identifying information that may or may not be visible to the first subscriber that can be used to identify the first subscriber.

27. An apparatus of claim 23, wherein information from one or more subscribers contained on the one or more computers or electronic storage devices includes at least the subscriber's name, address, email address, age and gender.

28. An apparatus of claim 23, wherein at least one of the advertisements in the one or more electronic books provided by the one or more computers or electronic storage devices contains a notification that the one or more subscribers who requested the one or more electronic books have won an incentive.

29. An apparatus of claim 28, wherein, in order for the one or more subscribers to receive the incentive, the one or more subscribers must provide or verify certain information or perform certain acts.

30. An apparatus of claim 23, wherein each of the one or more electronic books contain the name of the subscriber who requested the electronic book.

31. A method for providing individuals with a plurality of electronic books containing targeted advertising comprising:
   a. receiving on a computer the contents of two or more books;
   b. receiving one or more subscriber target criteria for one or more advertisements;
   c. receiving or creating one or more advertisements that are associated with the one or more subscriber target criteria;
   d. receiving on a computer information from a first subscriber interested in receiving one or more electronic books;
   e. receiving on a computer a first request from the first subscriber for a first electronic book;
   f. determining if the information from the first subscriber requesting the electronic book satisfies the one or more subscriber target criteria for the one or more advertisements;
   g. selecting a first set of advertisements for the first electronic book by choosing at least one of the one or more advertisements having one or more associated subscriber target criteria that are satisfied by the information from the first subscriber requesting the first electronic book;
   h. inserting the selected first set of advertisements for the first electronic book into the first electronic book;
   i. providing the first electronic book for free to the first subscriber making a first request for a first electronic book;
      selecting a first set of advertisements for the first electronic book and inserting the selected first set of advertisements for the first electronic book into the first electronic book are performed in such a way that the first electronic book provided does not contain the same advertising in the same location of the electronic book as any other electronic book previously provided to a subscriber thereby identifying a unique first electronic book;
      wherein the number of times the subscriber can receive any one advertisement in one or more electronic books is limited to a particular number; and
      wherein the number of times any one subscriber can click on the advertisement in one or more electronic books to access the additional or related information about the advertisement is limited to a particular number.

32. A method of claim 31 wherein the advertisement contains a hyperlink to a webpage that, when selected or clicked by the subscriber, retrieves additional or related information about the advertisement.

* * * * *